US010543877B2

(12) United States Patent
Faraglia

(10) Patent No.: US 10,543,877 B2
(45) Date of Patent: Jan. 28, 2020

(54) ASSEMBLY FOR ADJUSTING THE GEOMETRY OF A VEHICLE SUSPENSION

(71) Applicant: Jofa S.R.L., Padua (IT)

(72) Inventor: Alessandro Faraglia, Albignasego (IT)

(73) Assignee: Jofa S.R.L., Padua (IT)

( * ) Notice: Subject to any disclaimer, the term of this patent is extended or adjusted under 35 U.S.C. 154(b) by 368 days.

(21) Appl. No.: 15/411,443

(22) Filed: Jan. 20, 2017

(65) Prior Publication Data

US 2017/0233019 A1 Aug. 17, 2017

(30) Foreign Application Priority Data

Jan. 21, 2016 (IT) .......................... 102016000005654

(51) Int. Cl.
 *B62D 65/12* (2006.01)
(52) U.S. Cl.
 CPC .................................... *B62D 65/12* (2013.01)
(58) Field of Classification Search
 CPC ............ B21D 1/12; B21D 1/14; B62D 65/12; G01M 17/04; B60G 2204/61; B60G 2204/93; B60G 2204/46; B60G 2204/462; B60G 2204/4622; B60G 2204/464
 USPC .................................................. 72/458, 705
 See application file for complete search history.

(56) References Cited

U.S. PATENT DOCUMENTS

| | | | | | |
|---|---|---|---|---|---|
| 3,977,067 | A | * | 8/1976 | LaValley | G01B 5/0028 29/407.04 |
| 4,344,325 | A | * | 8/1982 | Iwama | G01M 17/022 73/146 |
| 4,805,286 | A | * | 2/1989 | Uchida | B62D 65/12 29/404 |
| 4,856,199 | A | * | 8/1989 | Merrill | G01B 7/315 33/203.17 |

(Continued)

*Primary Examiner* — Adam J Eiseman
*Assistant Examiner* — Bobby Yeonjin Kim
(74) *Attorney, Agent, or Firm* — Stetina Brunda Garred & Brucker

(57) ABSTRACT

The present invention relates to an assembly for adjusting the geometry of a vehicle suspension. The assembly according to the invention comprises an adjustment head, which includes a supporting plate and an adjustable plate connectable in rigid manner to said wheel discs of the suspension. Such head comprises a joint, which connects the two plates defining a first rotation axis and a second rotation axis for the adjustable plate with respect to the supporting plate. The assembly according to the invention comprises connection means for connecting the adjustable plate to wheel disc. The assembly further comprises toe-in adjustment means, comprising at least one first locating element for the adjustable plate, the position of which is adjustable along a first adjustment axis. The assembly further comprises camber adjustment means, comprising at least one second locating element for said adjustable plate, the position of which is adjustable along a second adjustment axis. According to the invention, the position of said locating elements is defined as a function of the required toe-in and camber values. The (Continued)

assembly further comprises displacement means configured to move said head in the space along at least one displacement axis and independently from the activation of said connection means.

19 Claims, 21 Drawing Sheets

(56) References Cited

U.S. PATENT DOCUMENTS

| | | | | |
|---|---|---|---|---|
| 5,111,585 | A * | 5/1992 | Kawashima | G01B 7/315 33/203.12 |
| 5,533,403 | A * | 7/1996 | Haeg | G01M 13/027 73/669 |
| 5,815,935 | A * | 10/1998 | Fukuda | G01B 5/255 33/203.15 |
| 6,058,614 | A * | 5/2000 | Shibayama | G01B 5/255 33/203 |
| 6,374,665 | B1 * | 4/2002 | Somppi | B62D 17/00 73/146 |
| 2010/0274514 | A1 * | 10/2010 | Kamachi | G01B 21/26 702/94 |
| 2014/0318264 | A1 * | 10/2014 | Tagami | G01M 17/007 73/788 |

* cited by examiner

ASSEMBLY FOR ADJUSTING THE GEOMETRY OF A VEHICLE SUSPENSION

FIELD OF THE INVENTION

The present invention relates to an assembly for adjusting the geometry of a vehicle suspension aimed at assembling the suspension itself. The invention further relates to an assembly station of a vehicle suspension comprising such assembly.

PRIOR ART

In the automotive sector, the assembly of a suspension, either front or rear, envisages a step of screwing aimed at connecting the various elements which form the suspension. According to a first known assembly method, named pit toe-in method, all the screws of the suspension are tightened, either automatically or manually, except for those needed to adjust the wheel toe-in and camber, which instead are only approached. The suspension thus assembled, although not definitively, is installed on the vehicle. When the latter is completed, the toe-in and camber adjustment is completed "in the pit" by applying an appropriate tightening torque to the screws.

Another known assembly method, named pre-setting method, also envisages tightening all the screws, either automatically or manually, except for those for adjusting the toe-in and the camber, which are only approached. A pre-setting adjustment is successively envisaged on the toe-in and camber points. This adjustment envisages the use of lasers or potentiometer feelers to detect the orientation of the wheel assembly discs with respect to fixed references on which the suspension is positioned. The desired toe-in and camber values are reached by checking such orientation and acting on the adjustment screws present on the suspension at the same time. When the desired orientation is reached, the adjustment screws are tightened to the required torques. Once the vehicle has been completed, the correct toe-in and camber values are checked in the pit, with possible reworking and correction.

U.S. Pat. No. 6,058,614 describes an adjustment station in which a pre-setting adjustment is implemented by means of two side assemblies, each provided to adjust the angles of a corresponding wheel disc. Each side assembly comprises a head with a frame and a contact element connected to a joint. The latter defines two orthogonal axes for rotating the contact element with respect to the frame. The head further comprises two cylinders fixed to the frame in diametrically opposite positions to apply a pressure on the contact element which establishes a single and sole orientation for the element itself.

The pre-setting adjustment is performed by taking the head of the frame to a predetermined position in space. The contact element rests against the wheel disc and adapts to the its orientation by effect of the aforesaid joint. The aforesaid cylinders are deactivated. The disc angles (toe-in and camber) are detected by means of encoder sensors placed at the axes of the joint. The adjustment screws are turned until the angle values detected by the sensors correspond to those required by the suspension.

Alternatively, in the solution described in U.S. Pat. No. 6,058,614, the contact element may also be used to impose an orientation of the wheel disc. In this case, the adjustment screws are initially released so that the wheel disc can adapt to a position set by the contact element, and more precisely by two cylinders which act thereon. When the position set by the two cylinders is reached, the adjustment screws are closed.

The head of the machine described in U.S. Pat. No. 6,058,614 appears inconvenient when the contact element is used to set a given angle to the wheel disc and the two cylinders can establish a single and invariable orientation. This means that if the suspension type changes, i.e. if the required angles change, the cylinders must be replaced and the adjustment assembly must be tooled differently, e.g. varying the conformation of the contact element as a function of the different suspension to be angled. This translates into interruptions and long downtime.

According to a further known method, named geometry adjustment method, the suspension is tacked on a jig which defines fixed references. The wheel assemblies are constrained directly to two fixed heads, appropriately inclined by the desired toe-in and camber values. Having reached the desired inclination, all screws, including those the adjustment screws, are tightened. With this regard, each fixed head may be anchored directly onto a corresponding suspension wheel assembly, i.e. exploiting the wheel rim holes. Alternatively, each fixed head is provided with a fitting element, which engages on the hub cap. In all cases, the inclination of each head, i.e. the roto-translation thereof, is obtained by using a ball node and adjustment means which act on the head itself. Also in this case, when the vehicle finished, the correct toe-in and camber values are check in the pit and may be reworked.

The applicant has found that the three-suspension assembly and adjustment methods described above have limits and drawbacks. The pit toe-in and the pre-setting methods are the most used, because they are easy to implement and such to permit achieving high production volumes. However, it has been found that in case of suspensions with many elements, such as for example multi-link suspensions, the desired toe-in and camber values are not reached, because of the coupling clearances existing between the various elements. So, car manufacturers are forced to accept the fact that a percentage of vehicles may display non-optimal handling or that some reworking in the pit could take a particularly long time.

The geometry adjustment method is used seldom and only for small productions, because it requires very long implementation times. It has also been seen that such method, being based on mechanical rigidity, is not very flexible and does not adapt to the variability required for large productions. Another disadvantage is represented by the absence of a stable automatic measuring chain which makes it possible to ensure objective positioning repeatability, both active during the work cycle and passive with external control gages. Furthermore, it has been found that by implementing this method, the entire suspension must be reprocessed in case of errors or screwing failure. This aspect translates into very long reworking time, which in practice makes this method unfeasible for high rate productions.

Based on the considerations above, the need clearly arises for new solutions which make it possible to overcome the aforesaid drawbacks accompanying the methods and equipment currently used for defining the geometry and the assembly of a motor vehicle suspension.

SUMMARY OF THE INVENTION

It is thus the primary object of the present invention to provide an assembly for adjusting the vehicle suspension geometry, which makes it possible to overcome the aforesaid drawbacks. In the scope of this task, it is a first object to provide an adjustment assembly which makes it possible to make an adjustment and assembly process which is effective and repeatable. It is another object of the present invention to provide an adjustment assembly which is operatively versatile, i.e. which makes it possible to adjust the suspension geometry with different configuration also in the case of high production rates rapidly and effectively.

This task and these objects are achieved by an adjustment assembly of the geometry of a vehicle suspension as indicated in claim 1. The connection means of the adjustment assembly allow a stable connection of the adjustable plate to the corresponding wheel disc. In this manner, each position set to the adjustable plate is transferred to the disc. According to a first operative mode, the orientation of the adjustable plate is set by the adjustment means, and in particular by the position that each electrical actuator imposes on the corresponding locating element. Such position is advantageously adjustable as a function of the suspension type. This possibility translates into an adjustment which is "continuous", i.e. without interruptions, because no set-up or tooling operations of the assembly are needed, even in case of variation of the suspension type to be adjusted.

According to another aspect, the adjustment assembly comprises displacement means configured to move the adjustment head along one or more translation axes. Such displacement means make it possible to adjust the position in space of the wheel disc both before and after activating the connection means, i.e. either before or after connecting the adjustable plate with wheel disc. This further aspect makes the suspension geometry adjustment possible, meaning not only the adjustment of the toe-in and camber angles of the wheel disc, but also the possible adjustment (translation) of the disc position in space.

BRIEF DESCRIPTION OF THE FIGURES

Further features and advantages of the present invention will be more apparent in light of the detailed description of preferred, but not exclusive, embodiments of an adjustment assembly according to the present invention illustrated by the way of non-limitative example with reference to the accompanying drawings, in which.

Figure 1:
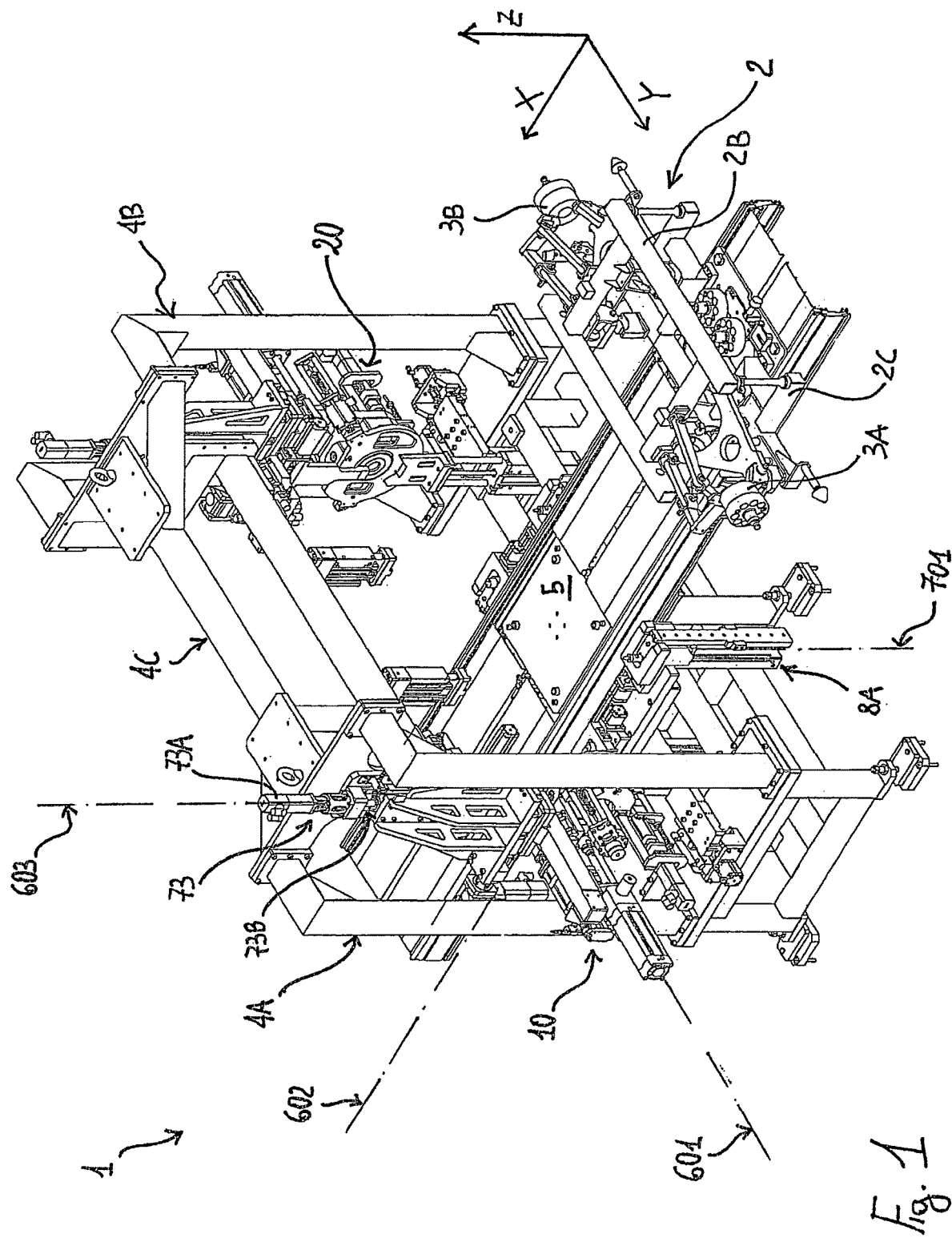
FIG. 1 is a perspective view of an adjustment and assembly station comprising an adjustment assembly according to the present invention.

Figures from 12 to 20 are views of the assembly in FIG. 1, each of which illustrates an operative state of the assembly itself.

The same reference numbers and letters in the figures refer to the same elements or components.

DETAILED DESCRIPTION OF THE INVENTION

With reference to the aforesaid figures, the adjustment assembly according to the invention is intended to be used in the scope of an assembly station of a motor vehicle suspension indicated by reference numeral 1. For the purposes of the present invention, the expression "assembly station" means a station in which an operative cycle is performed, which envisages the adjustment of the suspension geometry 2 and the screwing/fastening of the components of the suspension itself. With this regard, the figures show a mock-up of a suspension 2 adjustable by means of the present invention. Such suspension may be, for example, of the multi-link type. In all cases, the suspension 2 comprises a first wheel disc 3A and a second wheel disc 3B, on which the wheels of the vehicle will be mounted. For the purposes of the present invention, the expression "geometry adjustment" indicates the adjustment of the toe-in and of the camber of the wheel discs 3A,3B of the suspension 2, but also the possibility of adjusting the position of the discs themselves in space.

FIG. 1 shows a station 1 according to the invention comprising a supporting frame 4A,4B,4C which defines an inlet section and an outlet section for the suspension 2 into/from the station 1. The latter 1 further comprises a resting surface 5 for the suspension 2. The frame 4A, 4B, 4C and the resting plane 5 define three reference directions, hereinafter indicated by X, Y and Z. Reference direction X substantially corresponds to the vehicle axis and is substantially parallel to the direction of advancement of the vehicle. Direction Y is characteristic of the "transversal width" of the suspension 2, meaning the distance between the centers of the wheel discs 3A,3B. Finally, direction Z corresponds to a direction orthogonal to the resting plane 5, i.e. to the plane X-Y. Substantially, direction Z coincides with the vertical direction. As a whole, the three directions X, Y, Z define a fixed Cartesian reference system, also indicated hereinafter by the expression "machine system X-Y-Z".

The station 1 preferably comprises constraining devices, which define the technological references for positioning the suspension 2 in the machine system X-Y-Z. For the purposes of the present invention, the expression "technological reference" means a body/element configured to interact with at least one component of the suspension 2 in order to establish a precise position of the suspension itself in the machine system X-Y-Z. Such constraining devices are configured to establish the position of the suspension 2 on the plane X-Y in repeatable manner and/or to adjust the position of the suspension 2 along aforesaid direction Z again in repeatable manner.

Figure 3:
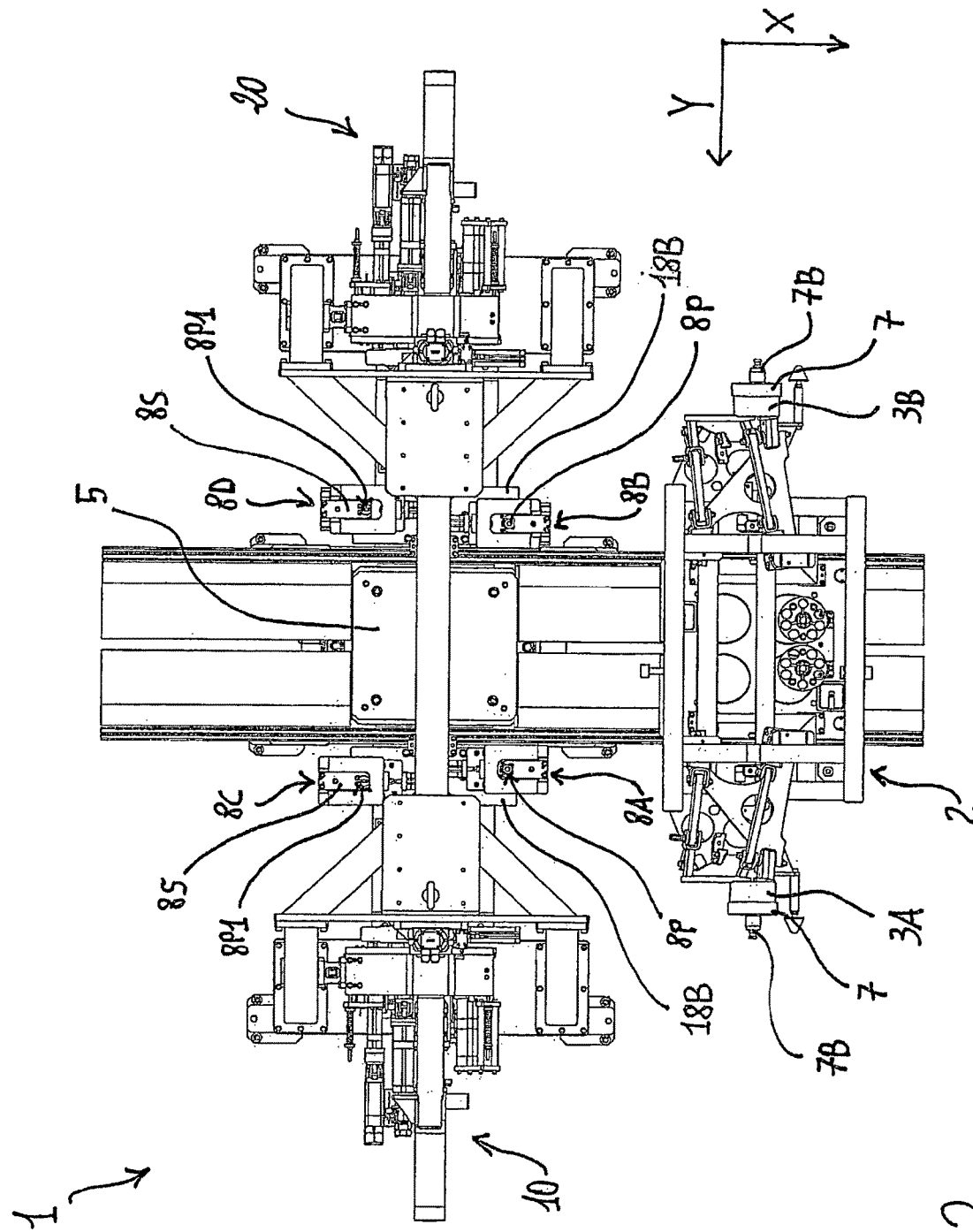
FIG. 3 is a plan view of the station in FIG. 1.

In station 1 shown in the figures, there are two first constraining devices (indicated by references 8A,8B) arranged near the inlet section of the station 1, while two second devices (indicated by references 8C,8D in FIG. 3) are arranged near the outlet section. All the constraining devices 8A,8B,8C,8D define a technological reference 8P,8P1 and are configured to adjust the position of the suspension 2 along direction Z. For such purpose, the constraining devices 8A,8B,8C,8D are provided with moving means, consisting, for example, of an electrical or pneumatic actuator, configured to move the corresponding technological reference, and thus the suspension 2, along a direction 701 (indicated in FIG. 1) parallel to axis Z until a given height is reached.

In the illustrated embodiment, the first constraining devices 8A,8B comprise a sliding element 8S, moved by an electrical actuator (not shown), at the end of which a pin 8P is mounted, configured to couple with/be inserted in a geometrically mating opening defined by through undercarriage 2B which supports the suspension 2 in stable manner. The second constraining devices 8C,8D are structurally similar to the first devices 8A,8B, but their corresponding pin 8P1 is configured to couple with/be inserted in a slot-shaped opening defined through the undercarriage 2B. As will be described in greater detail below, before the definitive assembly of the suspension 2, the constraining devices 8A,8B,8C,8D are activated so that each pin 8P,8P1 is inserted in the corresponding opening of the undercarriage 2B. The pins 8P of the first devices 8A,8B, establish a precise position for the suspension 2 on the plane X-Y. The slot-shaped openings facilitate instead the insertion of the pins 8P1 of the second devices 8C,8D keeping a direction of alignment in direction X or Y according to the shape of the slot. Once the position on the plane X-Y is established, the moving means displace the suspension 2 along Z until the predetermined height is reached. The position and the configuration of the constraining devices, i.e. of the respective technological references, may vary with respect to the example described above, e.g. as a function of the configuration of the suspension to be assembled.

Station 1 preferably comprises locking means 18A,18B configured to lock the suspension in the predetermined position along direction Z during the toe-in and camber adjustment, i.e. during the closing of the adjustment screws. According to a preferred embodiment, first locking means 18A are provided, configured to apply, when activated, a thrust on the suspension 2 directed towards the resting plane 5. Preferably, second locking means 18B are further provided configured to lock when activated the technological references of the constraining devices 8A,8B,8C,8D at the predetermined position along Z. As shown in the figures, the first locking means 18A preferably comprise a plurality of hydrodynamic actuators installed on the frame.

Figure 3A:
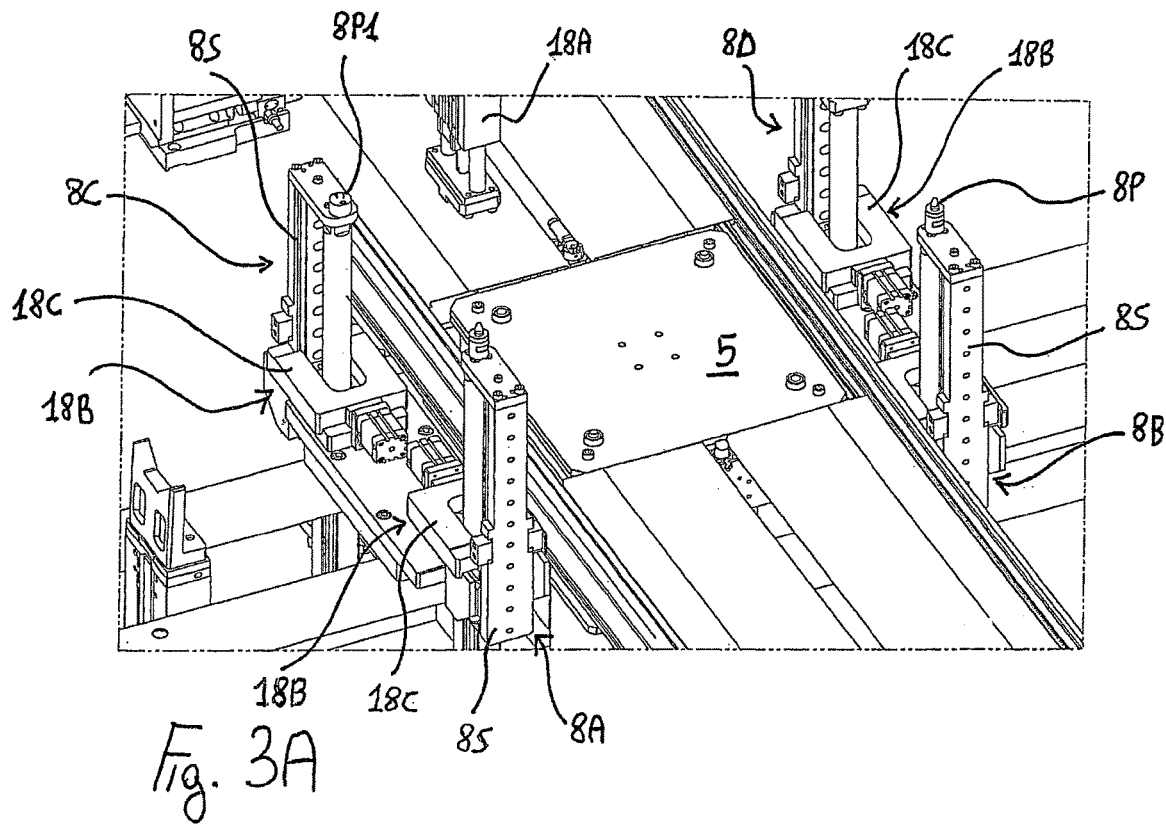
FIGS. 3A, 3B are detail views of components of station 1 in FIG. 1.
Figure 3B:
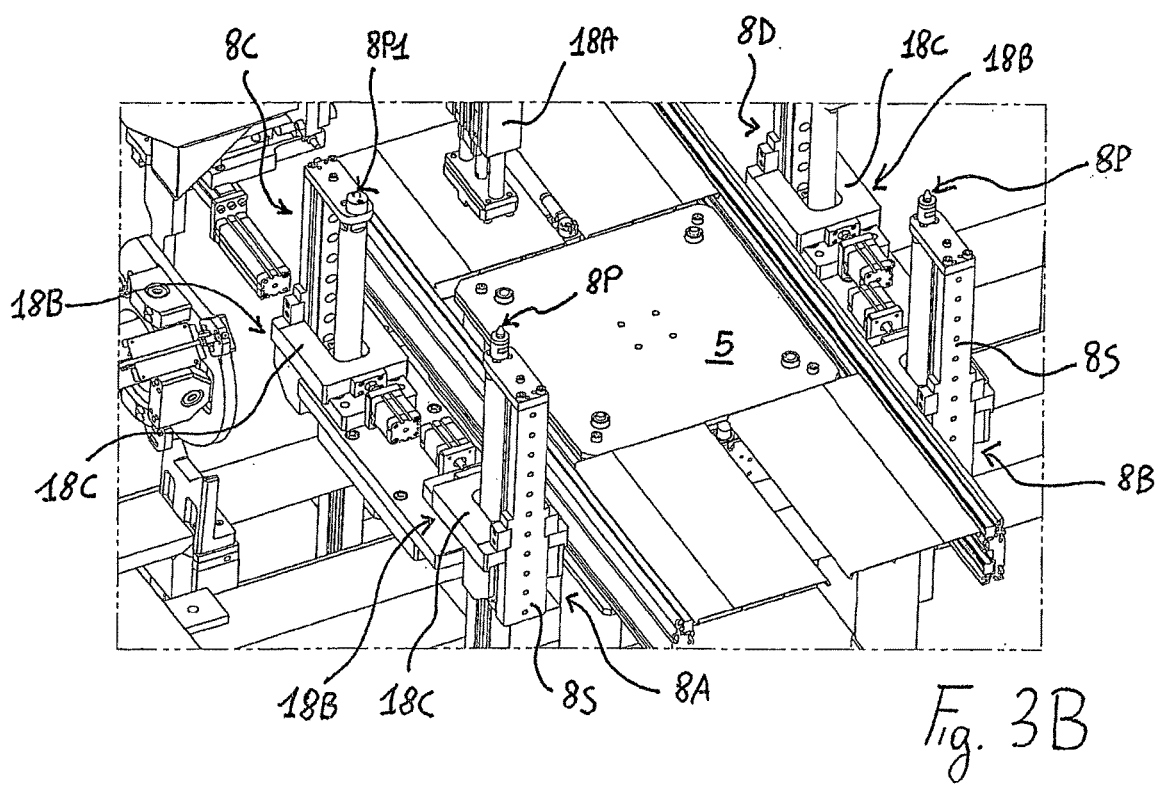

With reference to FIGS. 3A and 3B, for each constraining device 8A,8B,8C,8D, the second locking means 18B preferably comprise a locking plate 18C movable between a retracted position (FIG. 3A) and a working position (FIG. 3B). When the plate occupies the retracted position, the sliding elements 8S remain free to move along axis Z, while in the working position the plate 18C locks the corresponding sliding element 8S preventing its displacement along Z. Each plate 18C substantially defines a mechanical abutment for the sliding element 8S ensuring in such a manner the repeatability of the positioning of the suspension 2 along Z.

The entrance of the suspension 2 in the assembly station 1 may occur by means of a normal conveying system, which may be, for example, a robot, a pallet, a trolley or a hoist, which temporarily constrains the suspension at predetermined constraints/references. In the case illustrated in the figures, the suspension 2 is mounted on a frame 2C intended to rest on the resting plane 5 of the station 1. Having reached this condition, the suspension 2 is released from the constraints/references of the conveying system and constrained to the technological references defined by the constraining devices 8A,8B,8C,8D described above. In station 1, the resting plane 5 may be replaced by a different supporting structure according to the configuration of the suspension and/or of the conveying system used.

The station 1 preferably comprises a first adjustment assembly 10, configured to adjust the geometry of the first disc 3A of the suspension 2, and a second adjustment assembly 20, configured to adjust the geometry of the second disc 3B of the suspension 2. The two assemblies 10,20 are installed on mutually opposite parts 4A,4B of the frame with respect to the resting plane 5. Preferably, the frame 4 comprises a central part 4C which connects the two parts 4A,4B and which preferably supports the first two locking means 18A of the suspension along Z and/or screwing means (not shown), which can be used to tighten the screws of the suspension 2. Solely for simplicity of description, reference will be made hereinafter to the first assembly 10 for adjusting the geometry of the first disc 3A. The technical solutions described above, as the respective considerations on operation, also apply to the second assembly 20.

The first assembly 10 comprises an adjustment head 11, which includes an adjustable plate 12 rigidly connectable to the first disc 3A. The head 11 further comprises a supporting head 13 operatively connected to the adjustable plate 12 so that a translation along one of the axes of the machine system X, Y, Z, of the supporting plate 13 determines a corresponding translation of the adjustable plate 12. As explained in greater detail below, the position of the head 11 in the machine system X, Y, Z is adjustable, preferably by means of displacement means 71,72,73, each of which defines a corresponding displacement axis 601, 602, 603. The head 11 further comprises a joint 30 which connects the adjustable plate 12 to the supporting plate defining a first rotation axis 101 and a second rotation axis 102, orthogonal to the first rotation axis 101. Through the joint 30, the adjustable plate 12 can rotate about the rotation axes 101, 102 with respect to the supporting plate 13. The adjustable plate 12 defines a central reference axis 100 which crosses the intersection point between the two rotation axes 101,102 defined above.

The first assembly 10 comprises connection means to connect the adjustable plate 12 to the first wheel disc 3A in solid and integral manner. By means of such "rigid and integral connection", each angular movement of the adjustable plate 12 is transmitted to the first wheel disc 3A and vice versa. Substantially, by means of such connection, any relative movement of the first wheel disc 3A with respect to the adjustable flange 12 is prevented, and vice versa.

In particular, the connection means are configured so that, by means of such connection, the central axis 100 of the adjustable plate 12 coincides with the axis of the first wheel disc 3A. Such condition is kept during the entire adjustment process of the first wheel disc angles. By means of the connection of the adjustable plate 12 with the first wheel disc 3A, a rotation of the adjustable plate 12 about the first rotation axis 101 translates into a variation of the toe-in of the first wheel disc 3A, while a rotation about the second axis 102 translates into a variation of the camber. For the purposes of the present invention, the rotation about the first axis 101 is defined "toe-in", while that about the second axis 102 is defined "camber".

According to the invention, the first assembly 10 further comprises toe-in adjustment means 51 (hereinafter also indicated as first adjustment means 51) and camber adjustment means 52 (hereinafter also indicated as second adjustment means 52). The first adjustment means 51 include at least one first locating element 51A for said adjustable plate 12 and a first electrical actuator 510 connected to said first locating element 51A to adjust its position. More precisely, the first actuator element 510 defines a first adjustment axis 501 and is configured to adjust the position of the first locating element along the first axis 501.

Analogously, the second adjustment means 52 include at least one second locating element 52A for said adjustable plate 12 and a second electrical actuator 520 connected to said second locating element 52A to adjust its position. More precisely, the second actuator element 520 defines a second adjustment axis 502 and is configured to adjust the position of the second locating element along said such second adjustment axis 502.

In a first possible mode of use, the locating elements 51A, 52A may act on the adjustable plate 12 as hinges so as to adjust the orientation thereof with respect to the supporting plate 13. This determines a corresponding orientation of the first wheel disc 3A connected integrally to the adjustable plate by means of said connection means. In a second mode of use, the locating elements 51A,52A define a physical reference against which the adjustable plate 12 is made to rest. In all cases, according to the invention, the aforesaid electrical actuators 510,520 act on the corresponding locating elements 51A, 52A, adjusting the position thereof along the corresponding axes 501,502, as a function of the toe-in and camber values required, in turn, by the suspension to be adjusted. The electrical actuators 510,520, in addition to supply a very accurate adjustment, also confer a high operative versatility to the first assembly 10, which makes the adjustment "continuous", i.e. free from downtime and/or interruptions caused by tooling operations, such as those required by the aforesaid solution in U.S. Pat. No. 6,058,614.

The first assembly 10 preferably comprises displacement means 71,72,73 for moving/translating the head 11 along one or more displacement axes 601,602,603, each of which preferably parallel to one of the reference directions X, Y, Z of the machine system. In particular, such displacement means 71,72,73 make it possible to adjust the position of the head 11 in space independently from the activation of said connection means. This indicates that before connecting the adjustable plate 12 to the wheel disc 3, the displacement means 71,72,73 may be activated to move the head 11 in the space to a position near which the connection can be implemented between the two elements 3A,12. To complete such connection, in all cases, the displacement means will allow the translation of the head 11 in space so as to translate the wheel disc 3A to the position established in design of the suspension 2. With this regard, the adjustment of the toe-in and camber angles allowed by the adjustment means 51,52, combined with the adjustment of the position in space allowed by the displacement means 601,602,603, makes the complete geometry adjustment of the suspension possible.

In a first embodiment (shown in the figures), the locating elements 51A,52A are released from the adjustable plate 12 and each define a resting point for the plate itself. In a second embodiment (not shown in the figures), they are constrained to the adjustable plate 12, preferably by means of a hinge connection. In all cases, the locating elements 51A,52A have the purpose of establishing an orientation of the adjustable plate 12 with respect to the supporting plate 13, by effect of the joint 30 interposed between the two plates 12,13. As indicated above, once the adjustable plate 12 is integral and rigidly connected to the first wheel disc 3A, every variation of position (translation/rotation) of the adjustable plate 12 is transmitted to the first wheel disc 3A.

In a possible embodiment (shown in the figures), the first adjustment assembly 10 comprises pressure means 53 which act on the adjustable plate 12 in order to push it against the locating elements 51A,52A. More specifically, at least one pressure element 53A which acts on the adjustable plate 12 developing a force along a thrust direction or axis 503. Advantageously, the use of the pressure means 53 makes it possible to automate the geometry adjustment of a suspension 2 in which the eccentric adjustment screws are already inserted in the appropriate seats according to a method described below (automatic adjustment). If the eccentric adjustment screws are inserted and manually tightened by an operator in the assembly station (semiautomatic adjustment), then the pressure means 53 may be exploited as element for recovering the clearance to increase the positioning accuracy.

Figure 6:
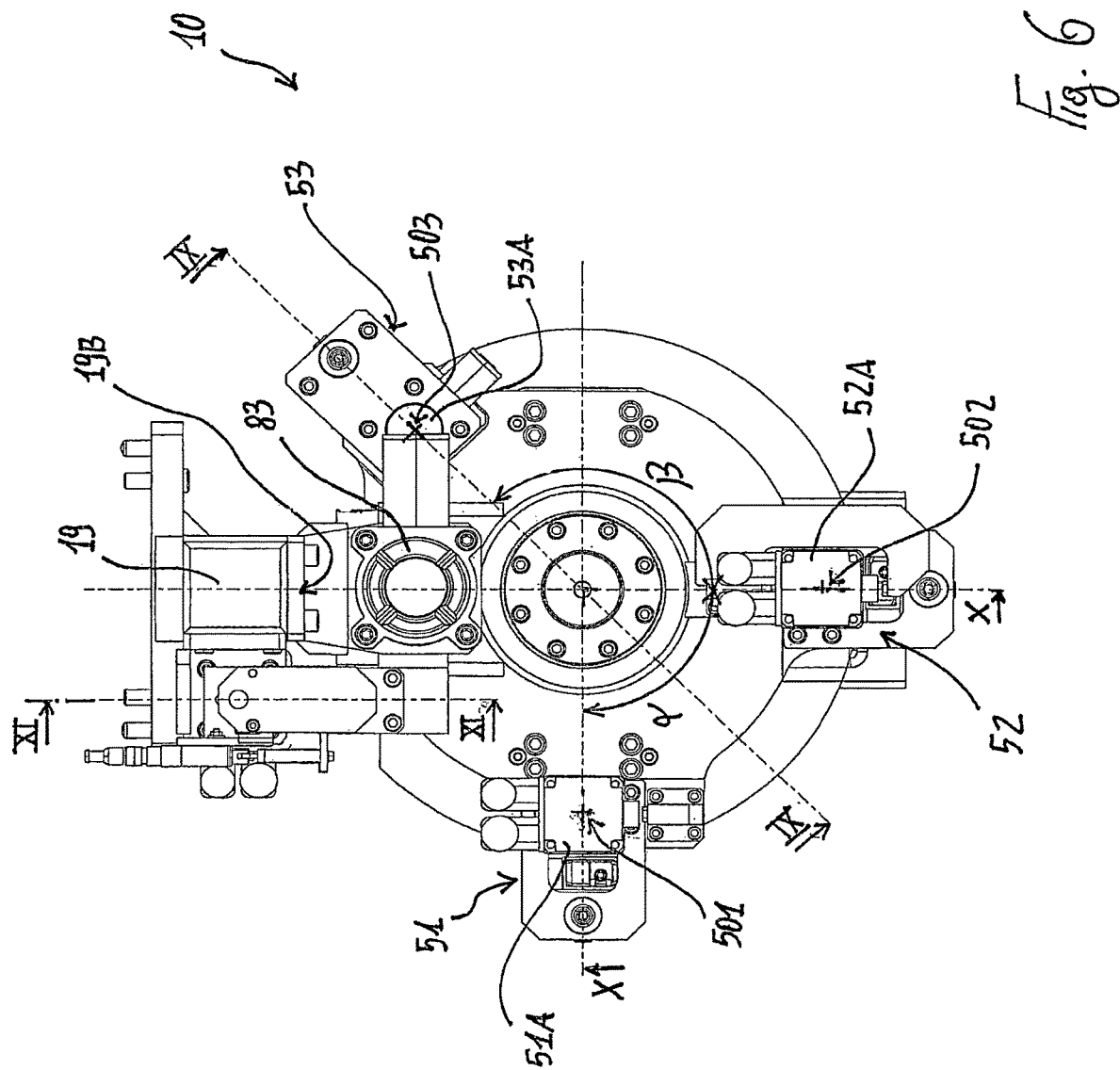
FIG. 6 is a front view of an adjustment head of the assembly in FIG. 1.

Figures from 6 to 11 show a possible embodiment of the first assembly 10. As indicated above, by means of the activation of the connection means, the central reference axis 100 of the adjustable plate 12 is aligned/coinciding with the axis of the wheel disc 3A. According to another aspect of the present invention, the adjustment means 51,52 are arranged so that the first adjustment axis 501 is offset with respect to the second adjustment axis 502 by an angle smaller than 180° determined with respect to the central reference axis 100. According to an embodiment, shown in FIG. 6, with respect to the central axis 100, the adjustment means 51,52 and the pressure means 53 are arranged so that the first axis 501 and the second adjustment axis 502 are offset by a first angle $\alpha$ of approximately 90° and so that the thrust direction 503 is offset with respect to each adjustment axis 501,502 by a second angle $\beta$ of approximately 135°.

Figure 7:
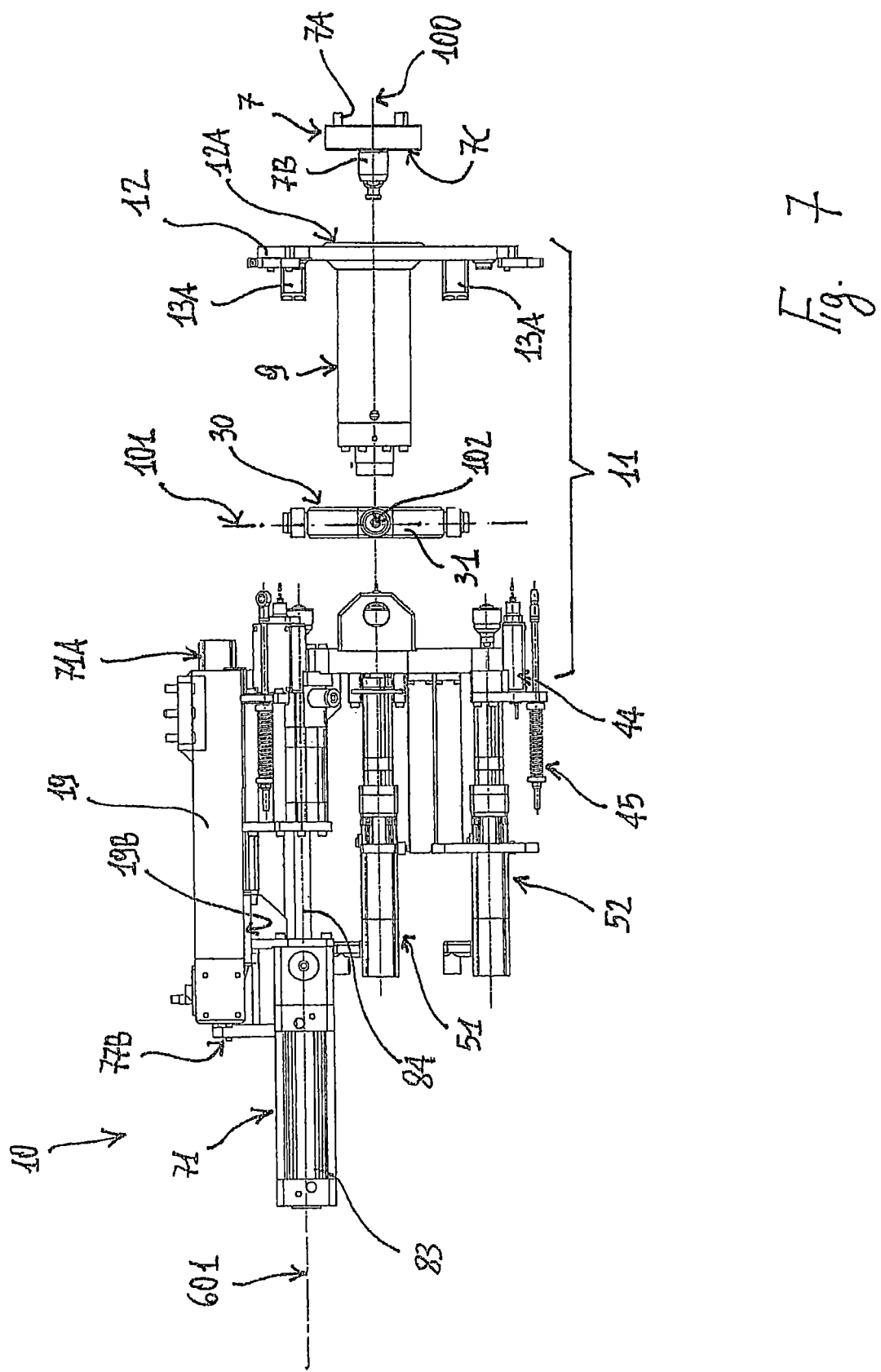
FIGS. 7 and 8 are, respectively, an exploded side view and a perspective exploded view of the adjustment head in FIG. 6.
Figure 8:
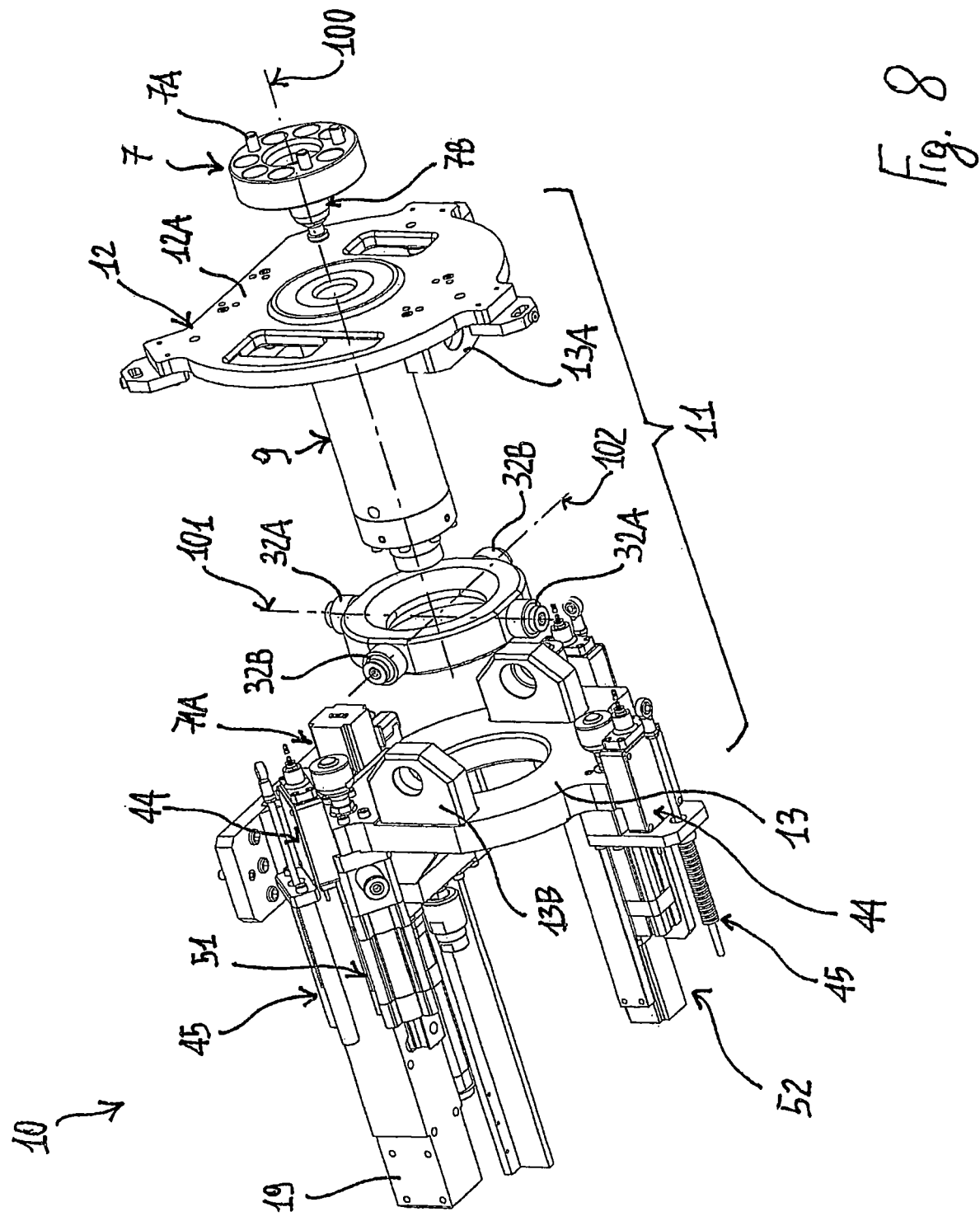

With reference to FIGS. 7 and 8, the joint 30 preferably comprises a ring-shaped body 31 and four pre-loaded bushings 32A,32B peripherally connected to said body 31 with an angular range of 90°. A pair of first bushings, indicated by reference 32A, defines the first rotation axis 101, while a pair of second bushings, indicated by reference 32B defines the second rotation axis 102. The adjustable plate 12 comprises a first pair of flanges, indicated by reference 13A, opposite to each of which one of said first bushings 32A is arranged. Similarly, the adjustable plate 13 comprises a second pair of flanges, indicated by reference 13B, opposite to each of which one of said second bushings 32B is arranged. As a whole, the joint 30 and the adjustable plate 12 are configured so that the central axis 100 crosses the intersection point between the two rotation axes 101,102 defined by the joint itself.

Figure 10:
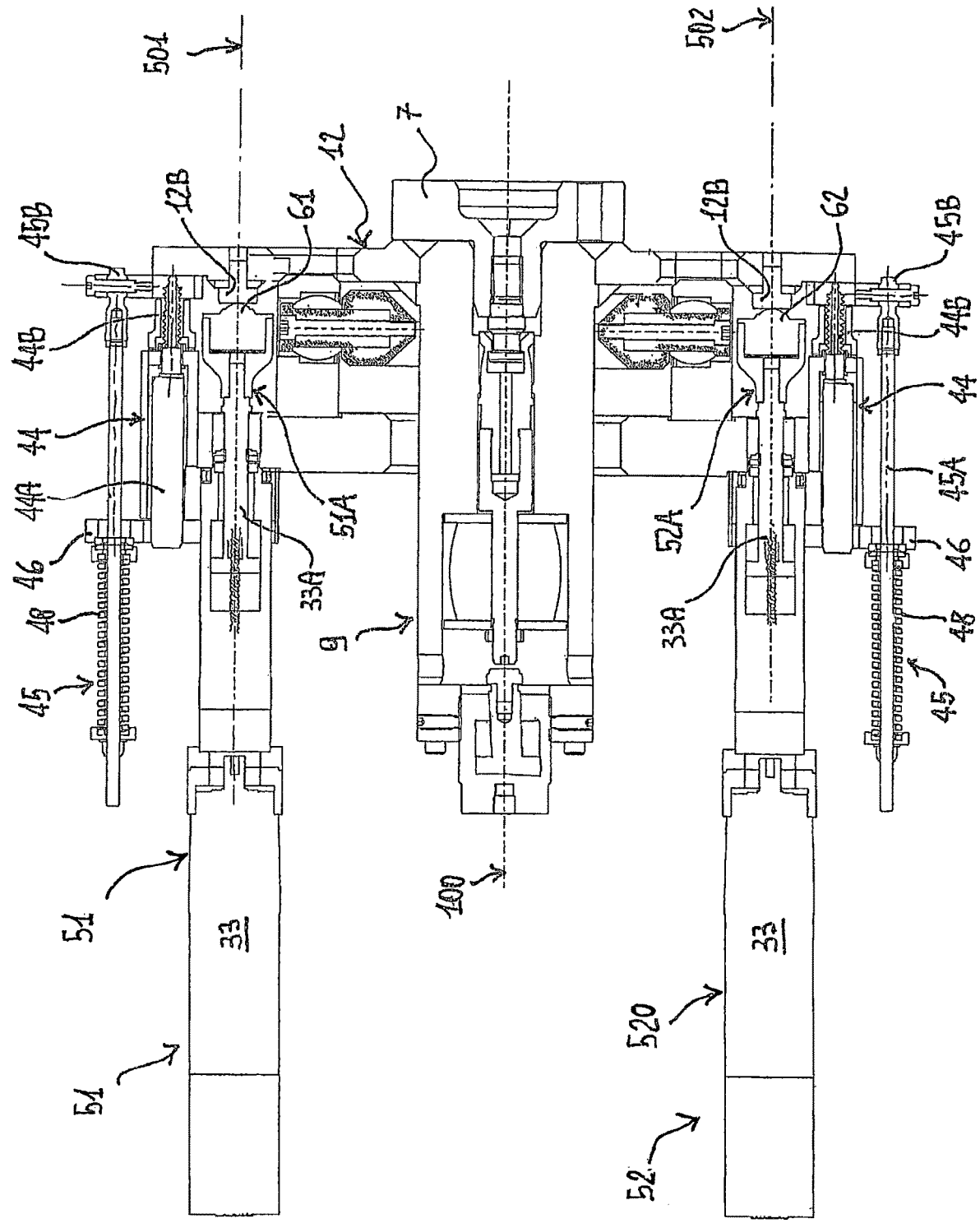
FIG. 10 is a view taken along section line X-X in FIG. 6.

With reference to FIG. 10, the first adjustment means 51 and the second adjustment means 52 indeed comprise an electrical actuator 510,520, which configures a corresponding adjustment axis 501,502 of electrical type, indicating with this expression a direction along which the position of the corresponding locating element 51A,52A is adjustable by effect of an electric control implementing by the corresponding actuator 510,520. Preferably, the electrical axes 501,502 defined above are parallel to each other and parallel to direction Y of the machine system X-Y-Z. For each adjustment axis 501,502, the corresponding electrical actuator 510,520 includes an electrical motor 33 which moves a rod 33A at the end of which the corresponding locating element 51A,52A is mounted. In the embodiment shown in the figures, the locating element 51A,52A has a resting end 61,62 of semi-spherical shape intended to rest against an abutment element 12B of the adjustable plate 12. The two electrical actuators 510,520 are operatively supported by the supporting plate 13. The two electrical actuators 510,520 may adjust the position of the locating elements 51A,52A so that they do not come into contact with the adjustable plate 12. In other words, as explained in greater detail below, the electrical actuators 510,520 can take the locating elements 51A,52A to a "neutral" position in which they are not influenced by any repercussions caused by the rotation of the eccentric adjustment screws.

Figure 9:
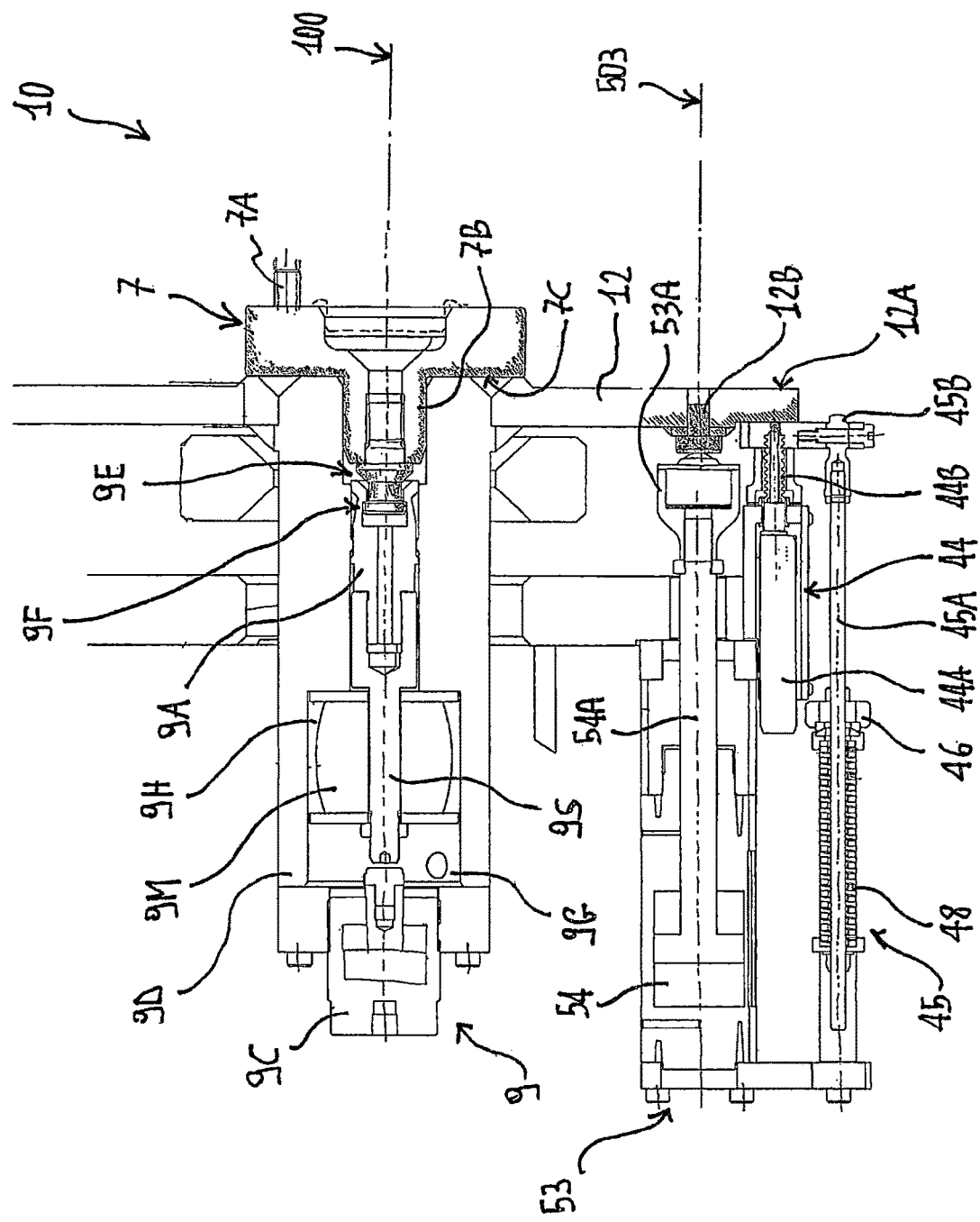
FIG. 9 is a view taken along section line IX-IX in FIG. 6.

With reference to FIG. 9, the thrust direction 503 of the pressure element 53A is preferably parallel to the aforesaid electrical adjustment axes 501,502. The pressure means 53 preferably comprise a pneumatic actuator 54, controlled by means of an appropriate solenoid valve (not shown), which moves a rod 54A at the end of which the pressure element 53A is mounted. Preferably, the latter has a similar conformation to that described above for the locating element 51A, 52A of the adjustment means 51,52. It has been seen that the use of a "pneumatic type" actuator makes it possible to obtain a particularly balanced movement of the adjustable plate 12 capable of adapting to given anomalies determined, for example, by components which are not coherent with the suspension type to the assembled or which are incorrectly assembled.

According to a further aspect, the assembly according to the invention comprises a control unit (hereinafter indicated by the acronym ECU) operatively connected to the first adjustment means 51, to the second adjustment means 52 and, if present, also the pressure means 53. Specifically, said ECU is configured to calculate the correct position which must be assumed by the locating elements 51A,52A along the electrical axes 501,502, as a function of the required toe-in and camber parameters, which depend on the suspension type in turn. Subsequently, the ECU sends control signals to the adjustment means 51,52 and more specifically to the electrical actuators 510,520 which permits the locating elements 51A, 52A to move along the corresponding adjustment axis 501,502. The ECU is further connected to the pressure means so as to control the activation/deactivation of the pneumatic actuator 54. Once activated, the pneumatic actuator 54 applies a force on the adjustable plate 12 which keeps it resting against the locating elements 51A,52B so as to recover any clearance.

The ECU is further connected to the displacement means 71,72,73 for the purpose of calculating the position which must be assumed by the wheel disc 3A according to the design of the suspension. By means of the activation of the connection means, the ECU will send control signals to the displacement means 71,72,73 so as to vary the position of the head 11, and consequently of the wheel disc 3A, in space, preferably along the aforesaid directions X, Y, Z. Instead, when the connection means are deactivated, the ECU may control the displacement means 71,72,73 so as to move the head in space and take the head 11 to a position adapted to connect to the disc wheel or to a neutral position.

According to another aspect, the adjustment assembly comprises position sensor means 44 for detecting the position of the adjustable plate 12 with respect to the adjustable axes 501,502. Preferably, the position sensor means are also configured to detect the position of the adjustable plate 12 with respect to the thrust direction 503. Preferably, the sensor means 44 comprise linear potentiometers each comprising a sensor body 44A, containing the electrical part, connected to the supporting plate 13, and a rod, movable with respect to the sensor body 44A, the end 44B of which is constrained to the adjustable plate 12. The rod is movable according to a direction parallel to the corresponding adjustment axis 501,502 or to the corresponding thrust direction 503. The position sensor means 44 are electrically connected to the ECU shown above to supply a feedback signal to it, which is characteristic of the position of the adjustable plate 12 with respect to the plate 13.

In the configuration described above, the sensor means 44 advantageously detect the changing of the position by three points of the adjustable plate 12. Each detection point is placed near an adjustment axis 501,502 and the thrust axis 503. This solution allows a very accurate reading of the behavior of the adjustable plate 12.

According to another aspect, the first assembly 10 comprises one or more return devices 45 of the adjustable plate 12 configured to stabilize it before the step of adjusting, and more precisely during the connection to the wheel disc 3A,3B. During such connection, the joint 30 makes the adjustable plate 12 floating with respect to the supporting plate 13 to be able to adapt to the wheel disc 3A. The return devices 45 have the function of contrasting the gravity which would tend to incline the adjustable plate 12. In the embodiment shown in the figures, three return devices 45 are provided, each of which is preferably arranged near one of the adjustment devices 51,52 or the thrust means 53. Each return device 45 comprises a rest 46 integral with the supporting plate 13 and a rod 45A, supported by the rest 46 and sliding with respect to it parallel to the corresponding adjustment axis 501,502 (or thrust direction 503). The end 45B of the rod 45A is anchored to the adjustable plate 12, preferably near the abutment element 12B on which the corresponding locating element 51,52 rests (or on which the thrust element 53A rests). Each return device 45 further comprises an elastic spring 48 operatively interposed between the rest 46 and the rod 45A so as to exert a constant traction force towards the resting plate 13.

According to a preferred embodiment of the invention, the connection means for connecting the adjustable plate 12 to the wheel disc 3A comprise a flange 7, which can be rigidly connected/screwed to the wheel disc 3A, and a coupling/uncoupling device 9 for coupling/uncoupling said flange 7. The device 9 is integral with the adjustable plate 12. As shown in the figures, the flange 7 preferably comprises fixing screws 7A, which can be screwed into the threaded holes of the wheel disc 3A normally used for fixing the wheel/tire rims. The flange 7 further comprises a coupling portion 7B which emerges, in axial position, from one opposite side with respect to the one from which the connection screws 7A emerge. The device 9 comprises a gripper 9A for removably coupling the coupling portion 7B of the flange 7. The gripper 9A can be switched between a closed configuration and an open configuration. The coupling device 9 also comprises a mechanical locking element configured to stably lock the gripper 9A in the closed configuration and an actuator 9C which, when it is activated, acts in contrast to said locking element, to switch the gripper 9A from the closed configuration to the open configuration.

The adjustable plate 12 is connected to the wheel disc 3A as follows. The flange 7 is preventively connected to the corresponding wheel disc 3A by means of the fixing screws 7A. The actuator 9C of the device 9 is activated to open the gripper 9A. The adjustable plate 12 approaches the flange 7 so that the coupling portion 7B is inserted inside the gripper 9A in open configuration. When the surface 12A of the adjustment plate 12 abuts against the surface 7C of the flange 7, the actuator 9C is deactivated. By effect of the locking element, the gripper 9A rapidly closes, coupling the coupling portion 7B so that the flange 7 rests rigidly connected to the adjustable plate 12. At the end of the assembly of the suspension 2, the adjustable plate 12 is released from the flange 7 by activating the actuator 9C again.

The section view of FIG. 9 shows a possible, but not exclusive configuration of the connection means described above in detail. The device 9 comprises a body 9D which defines a centering hole 9E for the coupling portion 7B of the flange 7. The axis of such hole 9E corresponds to the central reference axis 100 defined above. The gripper 9A is inserted in a cavity 9F coaxial to the hole 9E and connected, by means of a rod 9S, and a further element 9G sliding in a chamber 9H. The mechanical locking element consists of a spring 9M housed in the chamber 9H. The actuator 9C instead is represented by a hydrodynamic cylindrical which acts on the element 9G on the opposite side with respect to the one on which the spring 9M acts. It has been seen that the connection means described above make it possible to connect the two concerned parts (flange 7 and adjustable plate 12) rapidly, ensuring at the same time a high coupling force between the parts themselves.

In order to promote and optimize the connection between the adjustable plate 12 and the corresponding wheel disc 3A,3B, the first assembly 10 comprised a pre-centering device which, when activated, acts preferably on the flange 7 so as to displace it and consequently the wheel disc 3A to a predetermined position in which the connection with the adjustable plate 12 is achieved. When such connection is completed, the pre-centering device is deactivated. Consequently, during the step of adjusting, the pre-centering device does not apply any action on the flange 7 or thus on the wheel disc 3A connected to it.

In the preferred embodiment shown in the figures, the pre-centering device comprises a pair of jaws 15A,15B configured to engage opposite surface portions of the flange 7. For each of said jaws 15A,15B translation means 16A,16B of the position of the jaw itself are provided. Such translation means 16A,16B are configured for moving, in a first step, the jaw 15A,15B from a waiting position, corresponding to a deactivation of the pre-centering device, to an engaging position which said flange 7. In a second step, the translation means 16A,16B move the jaws 15A,15B, engaged by the flange 7, to the predetermined position for centering/connecting the adjustable plate 12. The translation means 16A,16B are preferably configured to implement a translation of the corresponding jaws 15A,15B along one or more movement directions, each parallel in a direction of the machine system X-Y-Z.

Figure 5:
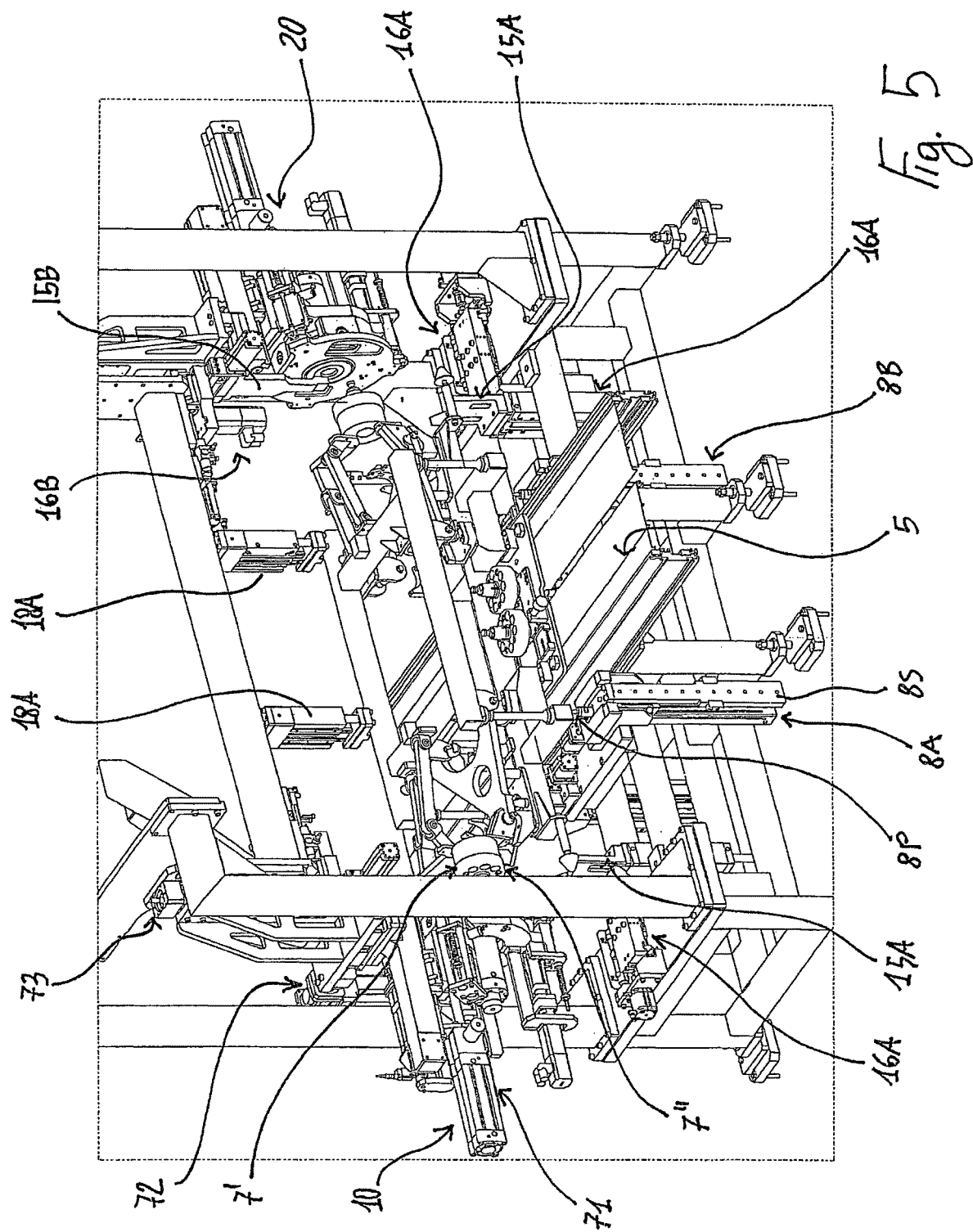
FIG. 5 is further a perspective view of the station in FIG. 1.
Figure 12:
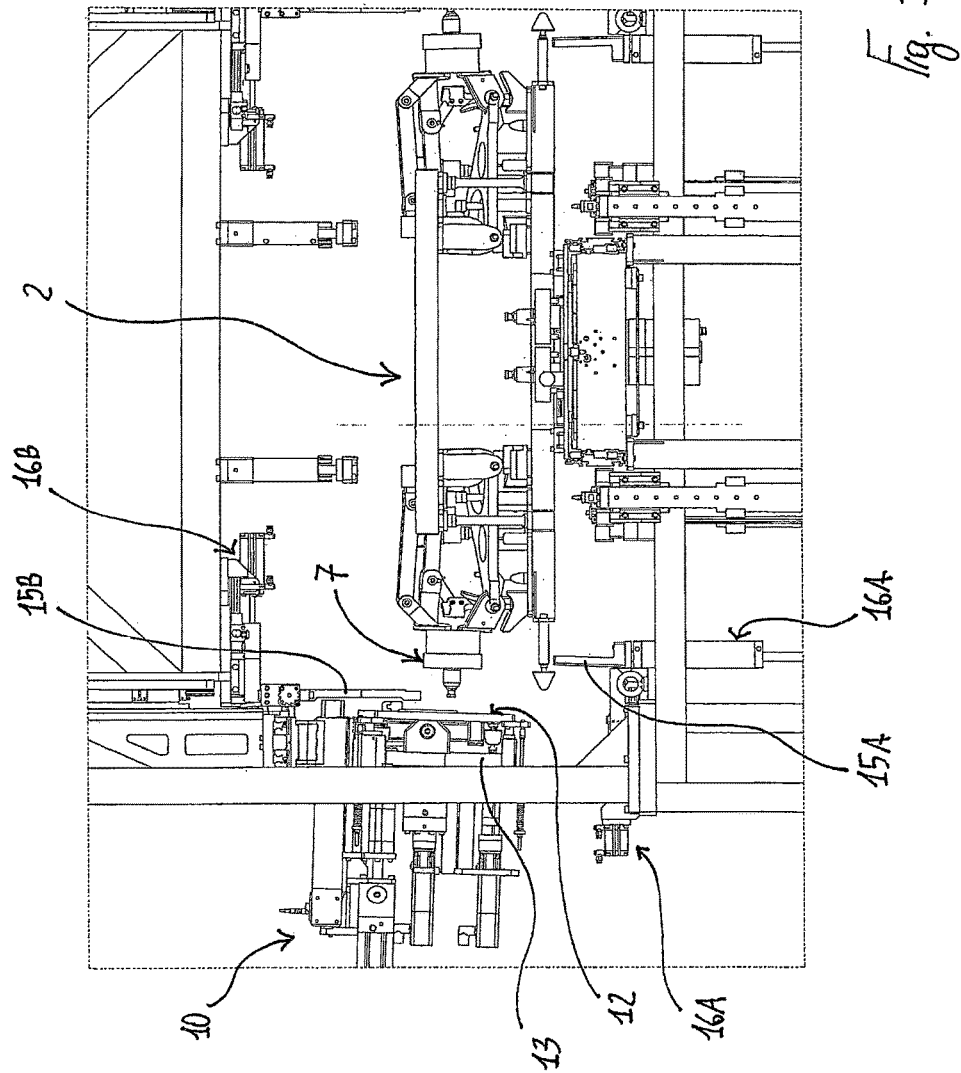
Figure 13:
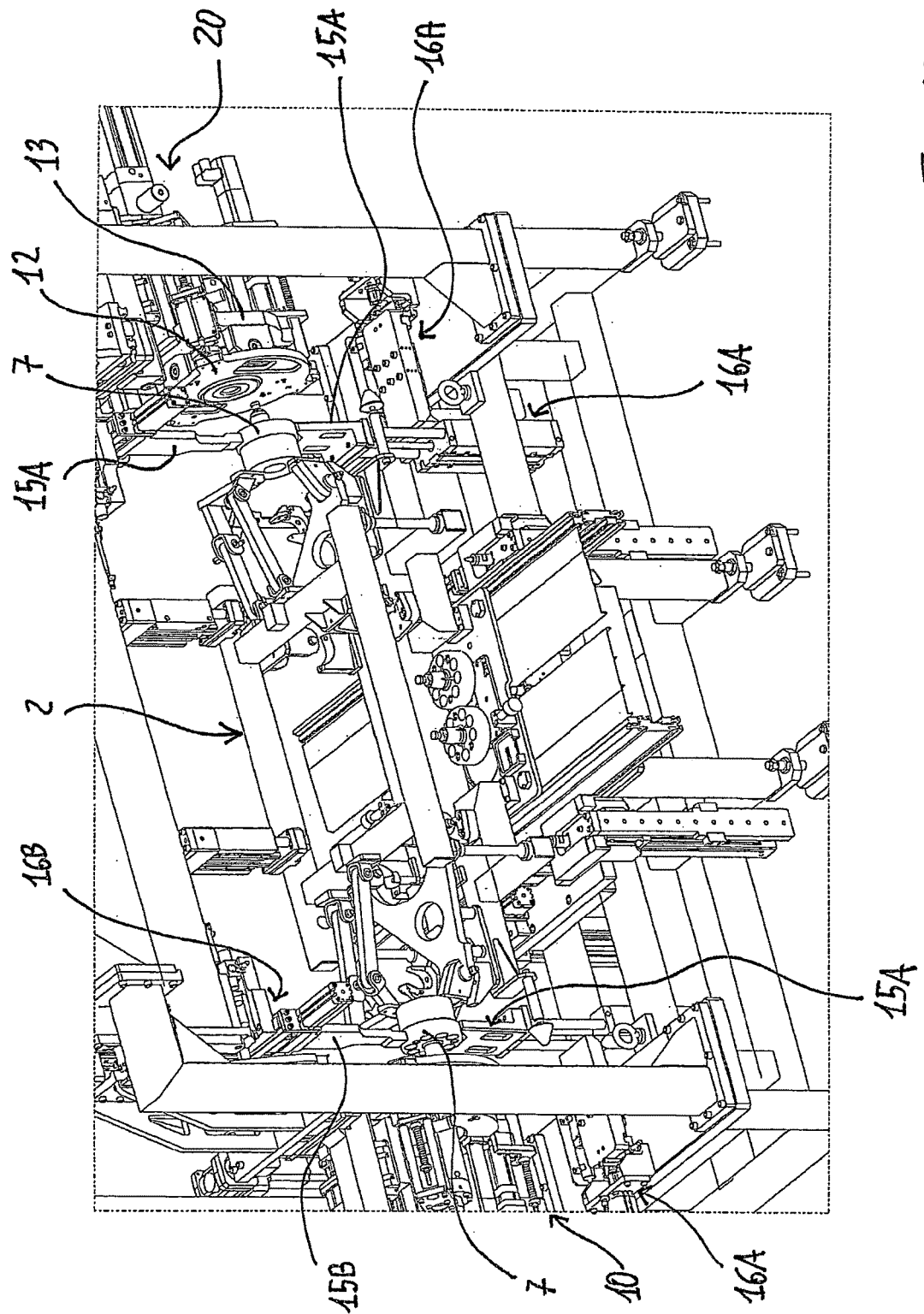
Figure 14:
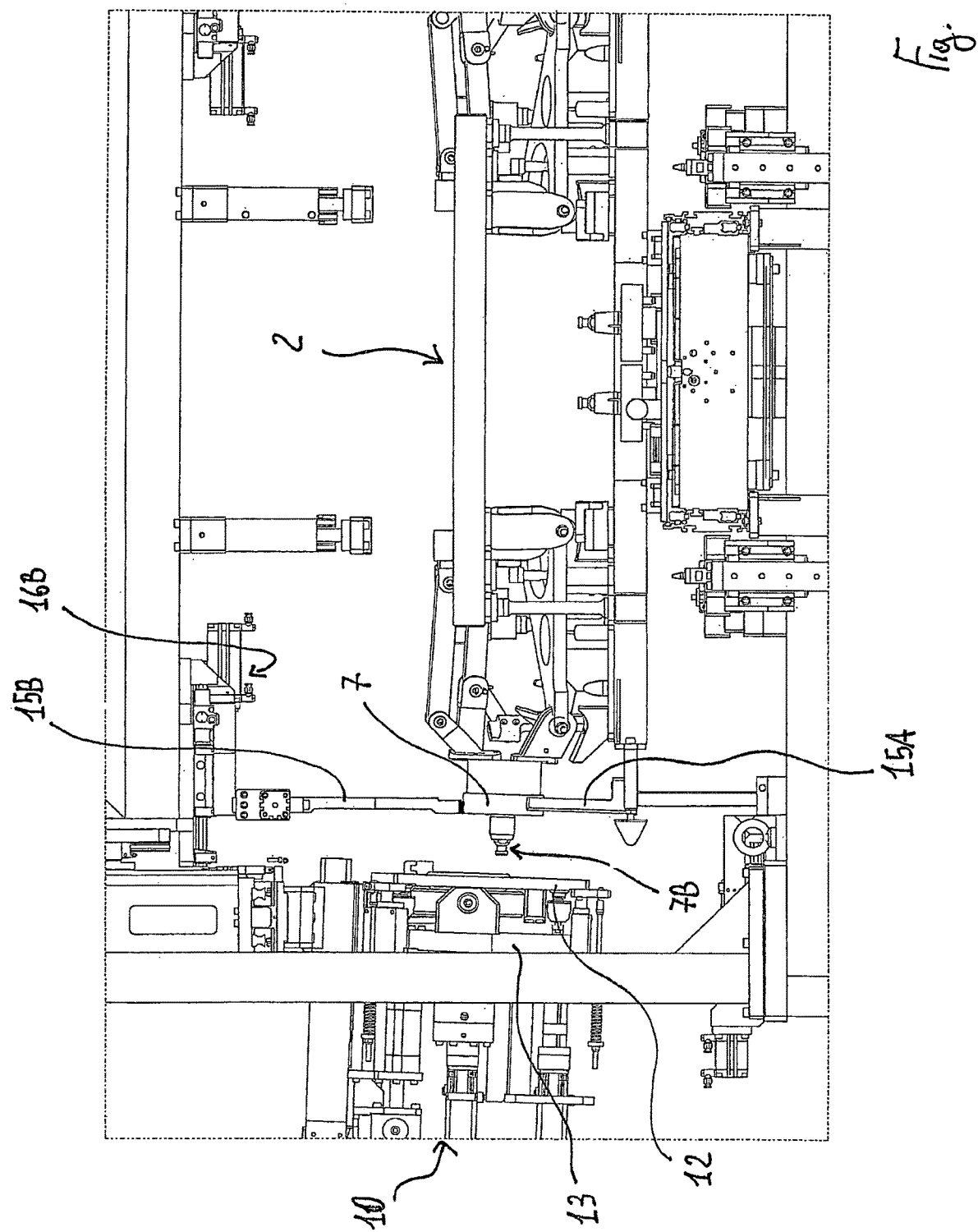
Figure 15:
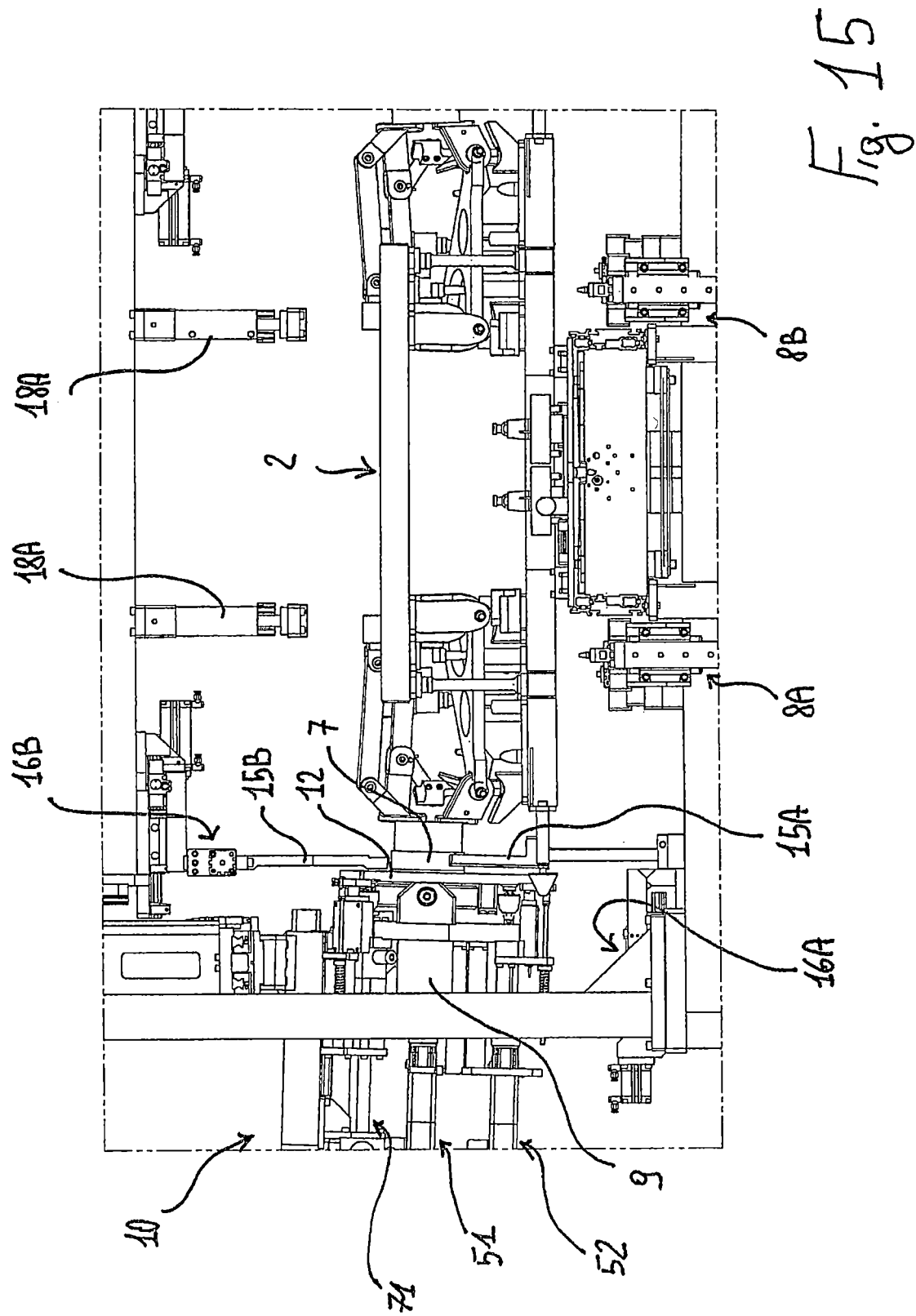
Figure 18:
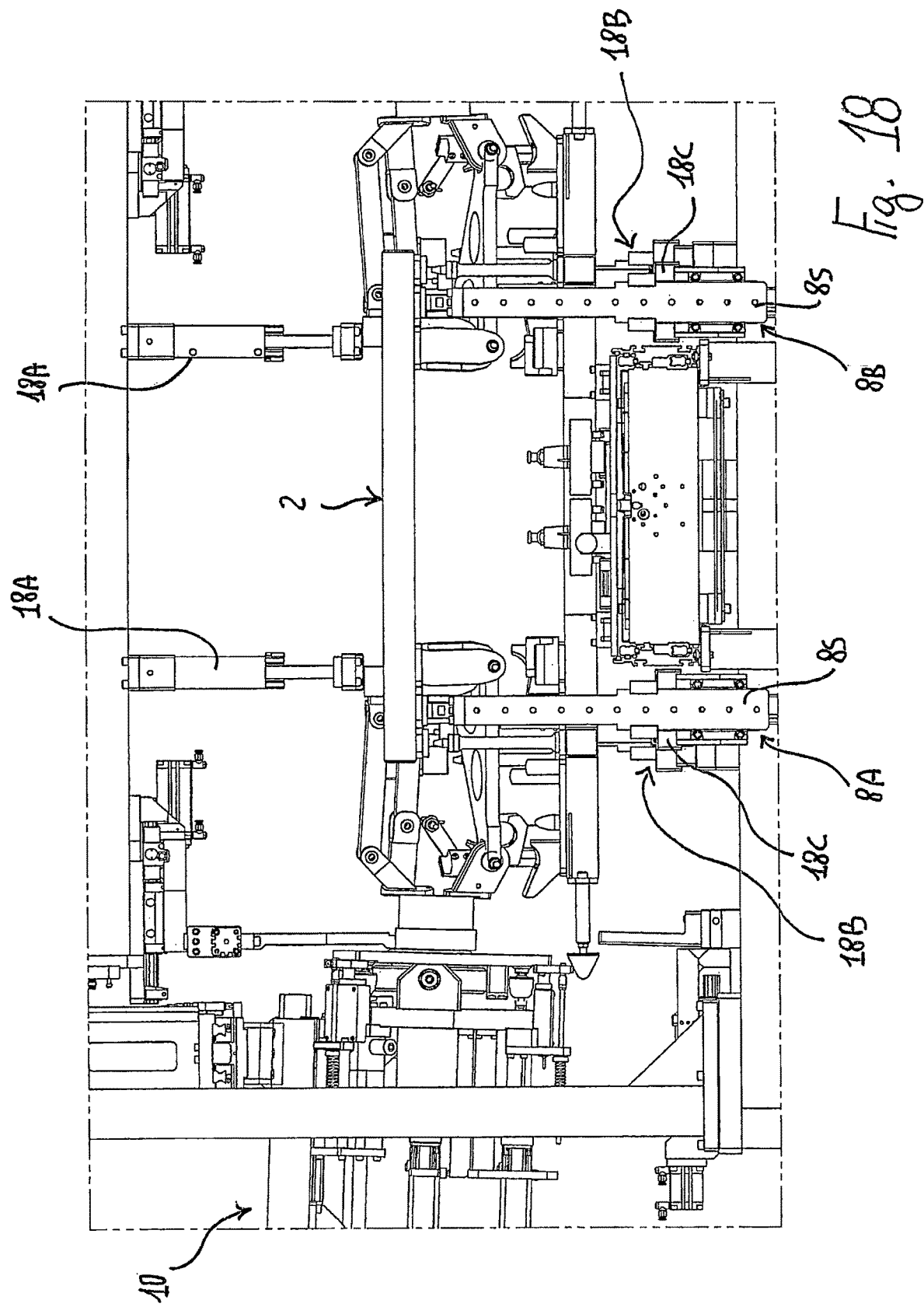
Figure 19:
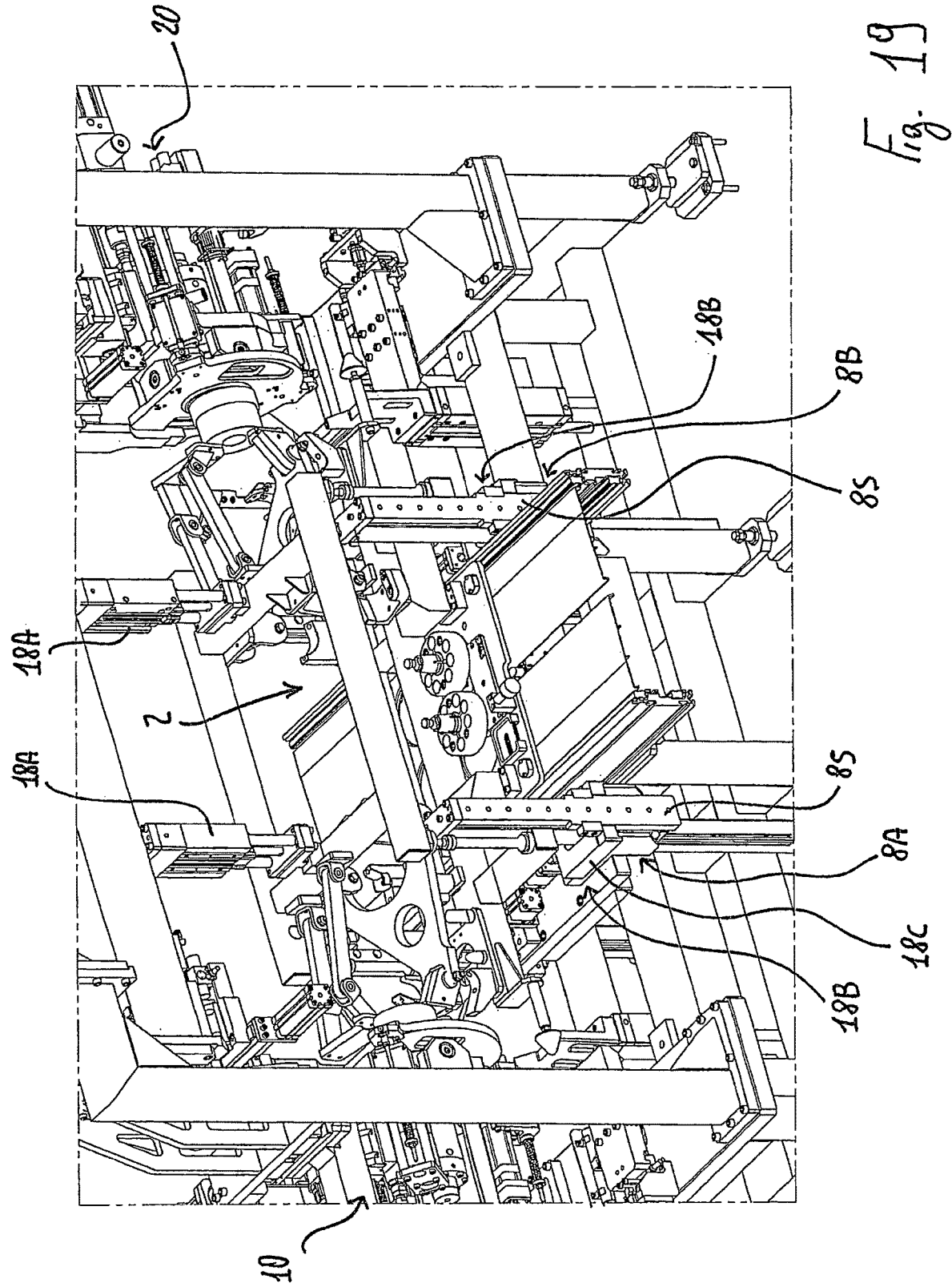

In the embodiment shown in the figures, the lower jaw 15A and the upper jaw 15B are configured to engage an upper portion 7' and a lower portion 7" of the body of the flange 7, respectively (see FIG. 5). FIG. 12 shows the two jaws 15A,15B in the waiting position, while FIGS. 13 and 14 show the two jaws themselves in the engaging position with the flange 7. Finally, in FIGS. 15 and 16, the two jaws 15A,15B occupy the predetermined centering/connecting position with the adjustable plate 12. With this regard, once such connection is completed, and before adjusting the geometry of the suspension 2, the two jaws 15A,15B are taken back to the waiting position as shown in FIG. 18.

In the aforesaid figures, a possible configuration of the translation means 16A,16B can be noted which comprise two electrical actuators which move the lower jaw 15A parallel to axis Y and to axis Z and three actuators which move the upper jaw 15B each along a direction parallel to a direction of the machine system X, Y and Z. It is within the scope of the present invention the possibility to configure the jaws, like the translation means, differently, e.g. as a function of the dimension of the suspension and/or for the configuration assigned to the frame of the assembly station.

According to a further aspect, the displacement means comprise a first displacement unit 71, defining a first displacement axis 601 parallel to direction Y of the machine system X-Y-Z, a second displacement unit 72 and a third displacement unit 73, defining a second displacement axis 602, orthogonal to the first displacement axis 601 and parallel to direction X, and a third displacement axis 603 parallel to direction Z define above and orthogonal to the other two displacement axes 601,602, respectively. As a whole, and according to that shown above, the units 71,72,73 are configured to adjust the manufacturing offset, i.e. to adjust the position of the head itself as a function of the type of suspension to be assembled. The first unit 71, for example, allows the adjustment of the position of the head 11 as a function of the "vehicle track", i.e. the distance between the wheel discs 3A,3B. Similarly, the second units 72 and the third unit 73 allow the adjustment of the position along direction X and Z, respectively. In all cases, the displacement units 71,72,73 allow the adjustment of the position of the head 11 independently from the adjustment, for example to take the head to a position adapted to allow the coupling to the adjustable plate 12 with the flange 7.

Figure 4:
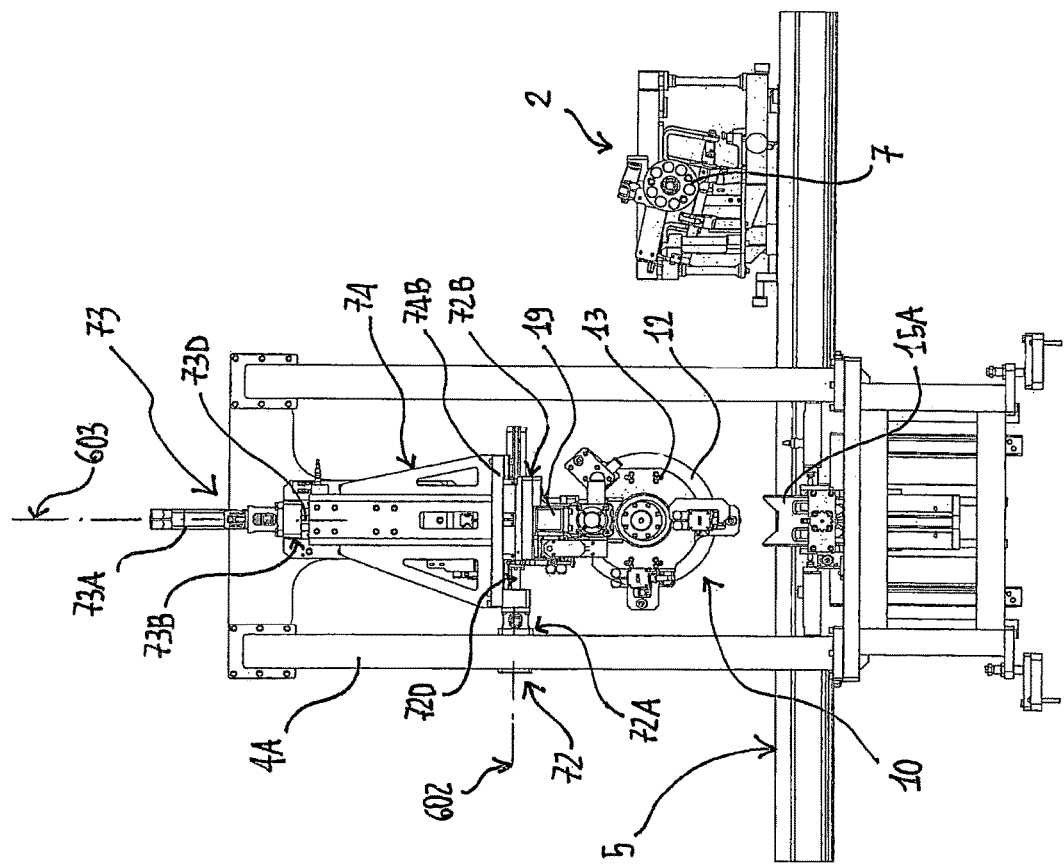
FIG. 4 is a side view of the station in FIG. 1.

Preferably, the displacement units 71,72,73 are of the electrical type, i.e. controlled electrically the displacement of the head 11 along the corresponding displacement axes 601,602,603. Thus, such axes are also indicated as displacement "electrical axes". For such purpose, the displacement units 71,72,73 each comprise at least one electrical actuator 71A,72A,73A electrically connected to the ECU. Specifically, the second unit 72 comprises an electrical actuator 72A and a guiding device 72B defining the orientation of the second displacement axis 602. With reference to FIGS. 1 and 4, the guiding device 72B comprises a slide sliding along a guide parallel to direction X. Such slide is integral with a supporting beam 19 which supports the supporting plate 13 of the head 11. The electrical actuator 72A moves an operative rod 72D integral with said slide determining the movement the supporting beam 19 along the electrical axis 602 parallel to X. The guide of the slide is integral with a portion 74B (parallel to the plane X-Y) of a supporting structure 74 connected to the frame of the station 1.

Figure 2:
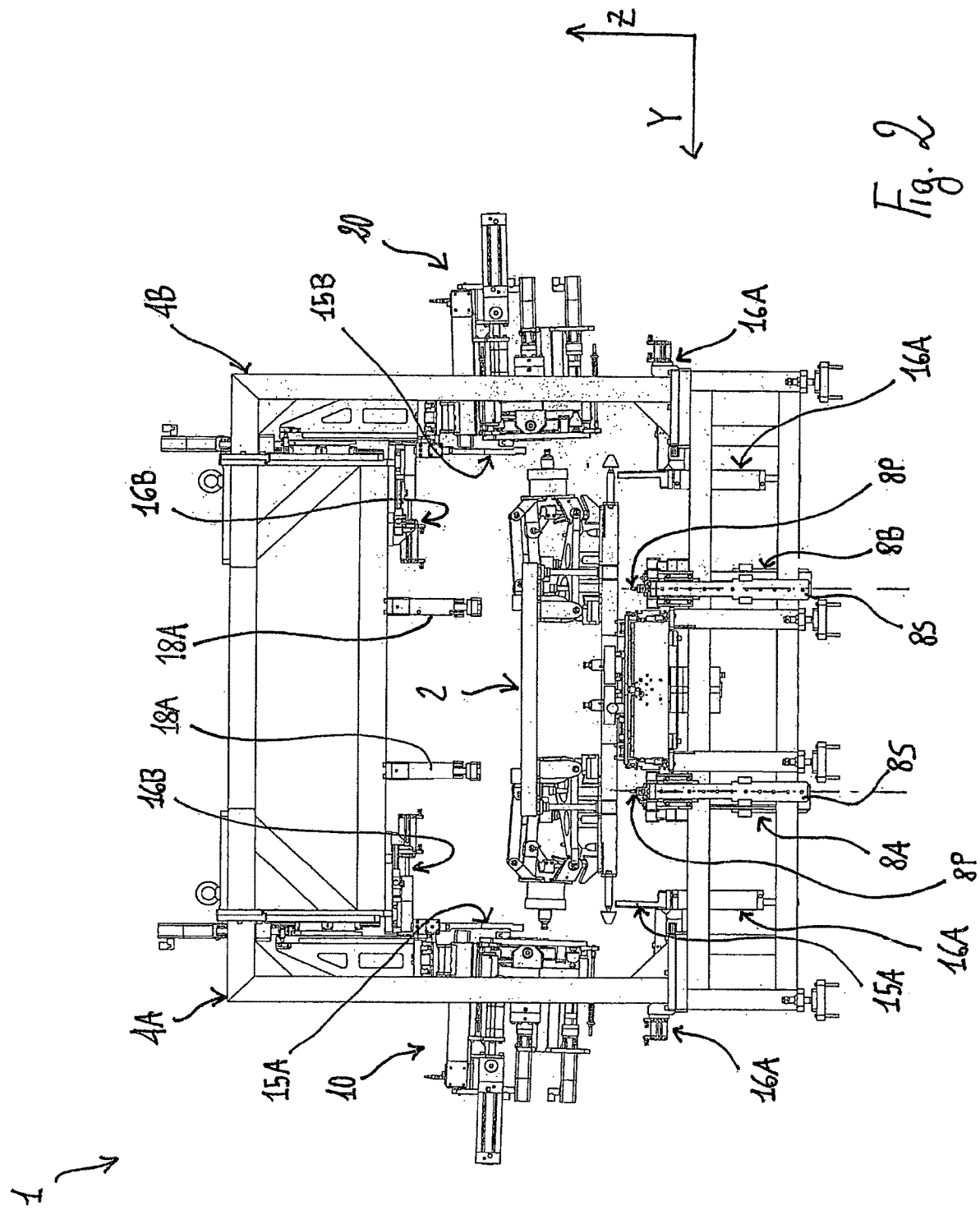
FIG. 2 is a front view of the station in FIG. 1.

Similarly, also the third unit 73 comprises an electrical actuator 73A, preferably mounted on the frame of the assembly station, and at least one guiding device 73B which defines the orientation of the third axis 603 (see FIGS. 1 and 2). In the example shown in the figures, the electrical actuator 73A comprises a rod 73D which slidingly moves the aforesaid supporting structure 74 with respect to the frame by effect of the guiding device 73B.

With reference to FIGS. 6, 7, 8 and 11, the first unit 71 comprises at least one electrical actuator 71A and further guiding device 71B defining the orientation of the first displacement axis 601. In the embodiment shown in the figures, such guiding device 71 B comprises one or more guides integral with a lower portion 19B of the supporting beam 19 indicated above which supports the head 11. The first unit 71 also comprises a pneumatic actuator 83 provided with a rod 84 operatively connected to the supporting plate 13 of the head 11 for moving it along the first axis 601. The electrical actuator 71A is connected to the ECU which controls its activation/deactivation. The electrical actuator 71A is further configured to define an abutment surface 78 for the head 11 pushed by the pneumatic actuator 83. Substantially, the abutment surface 78 represents a limit stop of the displacement of the head 11 along the third displacement axis 603.

Figure 11:
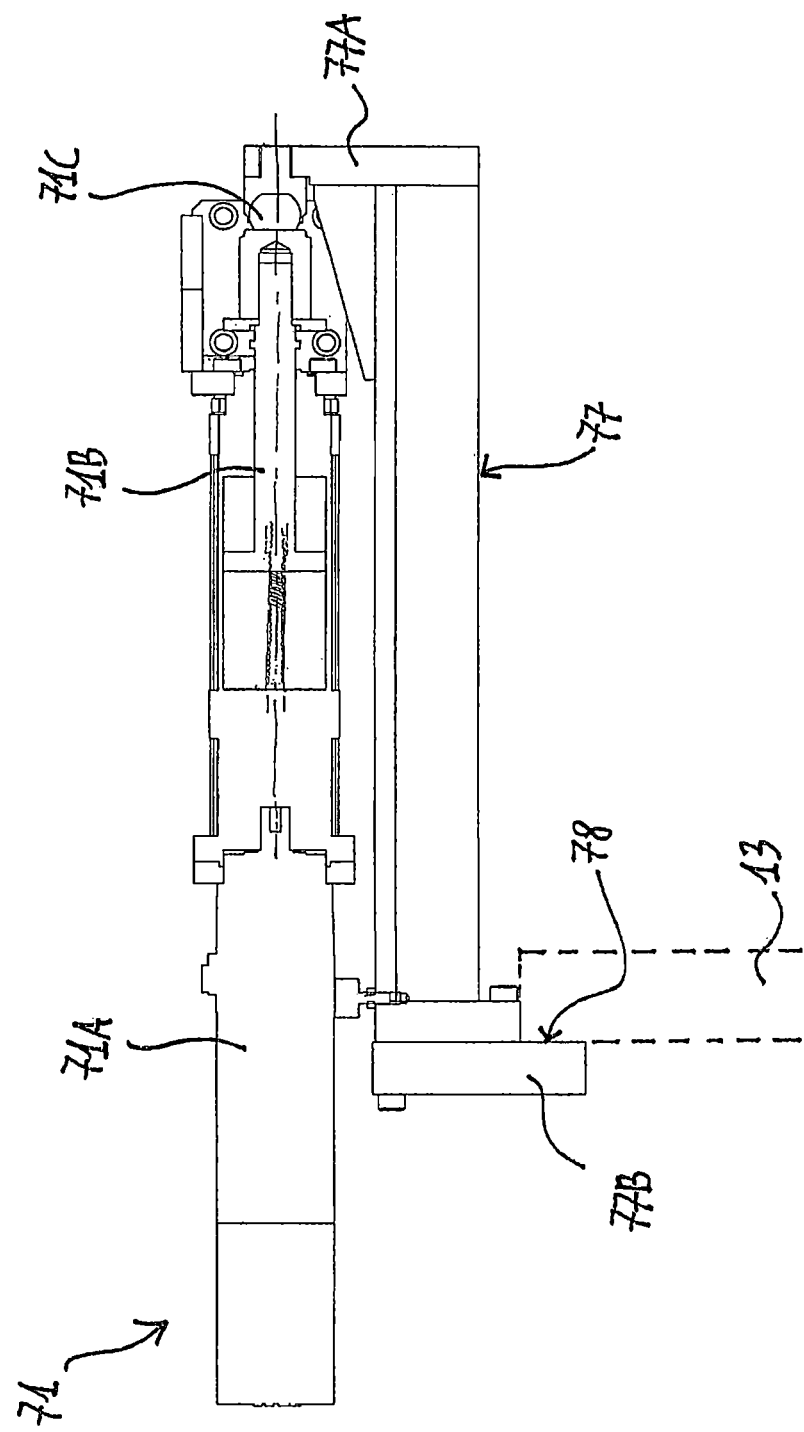
FIG. 11 is a view taken along section line XI-XI in FIG. 6.

As shown in the section view in FIG. 11, in a preferred embodiment, the electrical actuator 71A comprises a rod 71B, the end 71C of which is connected to the first end 77A of a movable reference element 77. The latter comprises a second end 77B, opposite to the first end 77A, which defines the abutment surface 78 for the head 11, and more precisely for the supporting plate 13, which is moved towards the pneumatic actuator 83. The adjustment of the position of the head 11 along direction Y firstly envisages the activation of the electrical actuator 71A, by the ECU, i.e. the adjustment of the position of the abutment surface 78. Having reached the desired position, the ECU controls the activation of the pneumatic actuator 83 which moves the head 11 along the first axis 601 until the support plate 13 come into contact with the abutment surface. It has been seen that this solution leads to a balanced movement and ultimately to the possibility of safely adjusting the orientation of the wheel disc 3A.

The present invention thus relates to an assembly station comprising at least one first adjustment assembly according to the present invention. The present invention also relates to a method for adjusting and assembling a suspension 2 by means of the assembly station 1 described above, and more precisely by using two adjustment assemblies 10,20 comprised in the station itself.

With reference to Figures from 1 to 4, the suspension 2, in a tacked configuration, is conveyed to the inlet section of the station 1 by means of a conveying system (known in itself). Either before or during such conveying, the flanges 7 of the connection device are connected, preferably screwed, to the corresponding wheel disc 3A,3B, as shown, for example in FIG. 1. With reference to FIGS. 5 and 12, the suspension 2 is thus arranged on the resting surface 5 in a position established by the conveying system. At this point, the two assemblies 10,20 intervene simultaneously on the corresponding wheel disc 3A,3B and according to the same cycle. Again for the sake of clarity, reference is made only to the first assembly 10, but the considerations which follow apply also to the second assembly 20.

At the end of the positioning of the suspension 2, the pre-centering device is activated for each operative assembly 10,20 and the corresponding jaws 15A,15B are moved from the waiting position (FIG. 12) to the engaging position (FIGS. 13 and 14) with the corresponding flange 7. Subsequently, the jaws 15A,15B take the flange 7 to the centering position at which the coupling with the head 11 of the assembly 10,20, and more specifically with the adjustable plate 12, occurs (see FIG. 15). In particular, in the centering position, the center of the wheel disc 3A is aligned with the reference axis 100 defined by the adjustable plate 100. The approaching of the head 11 to the flange 7 is achieved by activating one or more of the displacement units 71,72,73. The rigid coupling of the head 11 to the flange 7 is achieved by means of the activation of the coupling/uncoupling device 9 integral with the adjustable plate 12. As indicated above, such a device 9 allows a rapid and reliable coupling permitting the two parts (12 and 7) to become a single block rigidly constrained to the wheel disc 3A.

Figure 16:
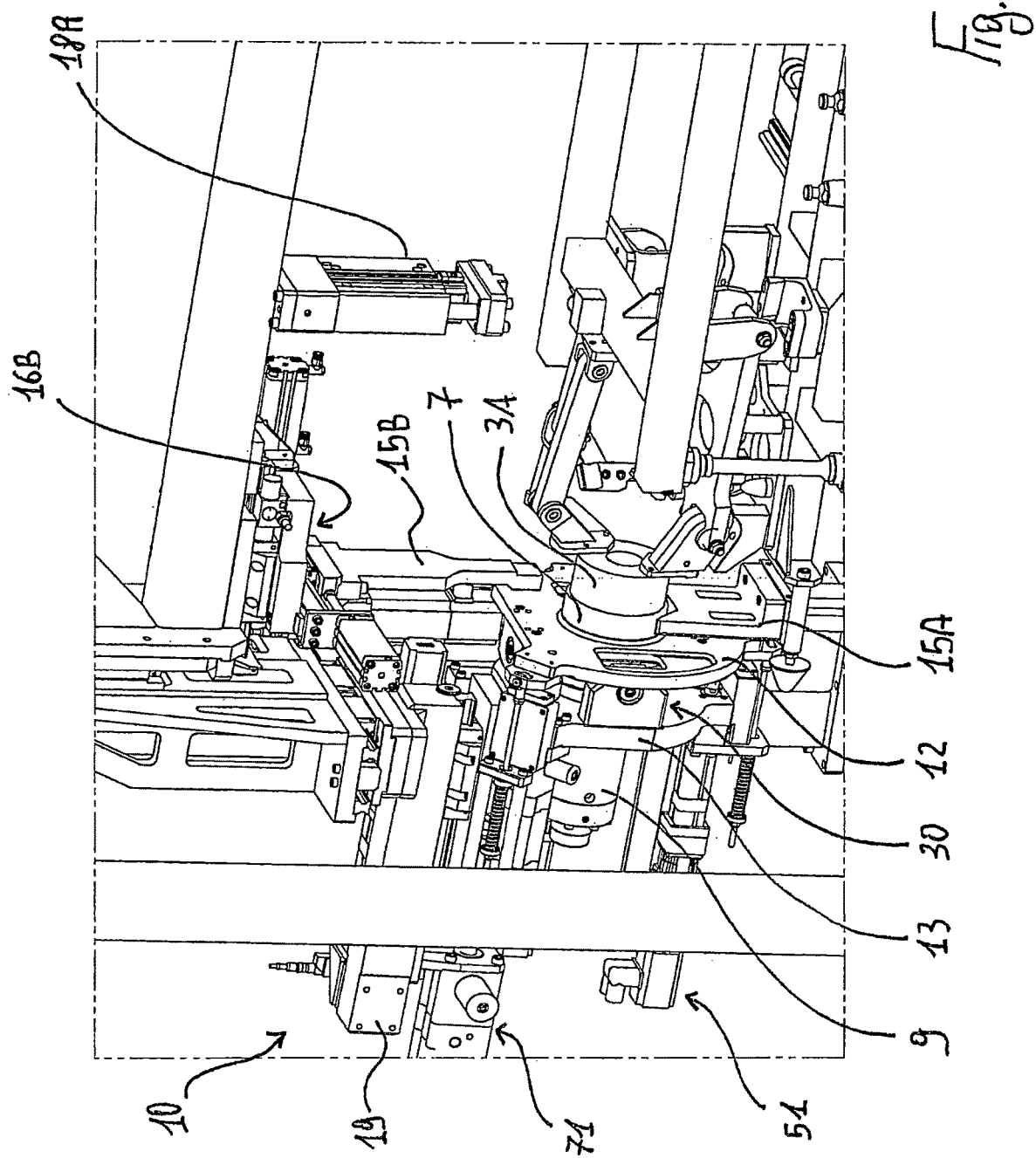
Figure 17:
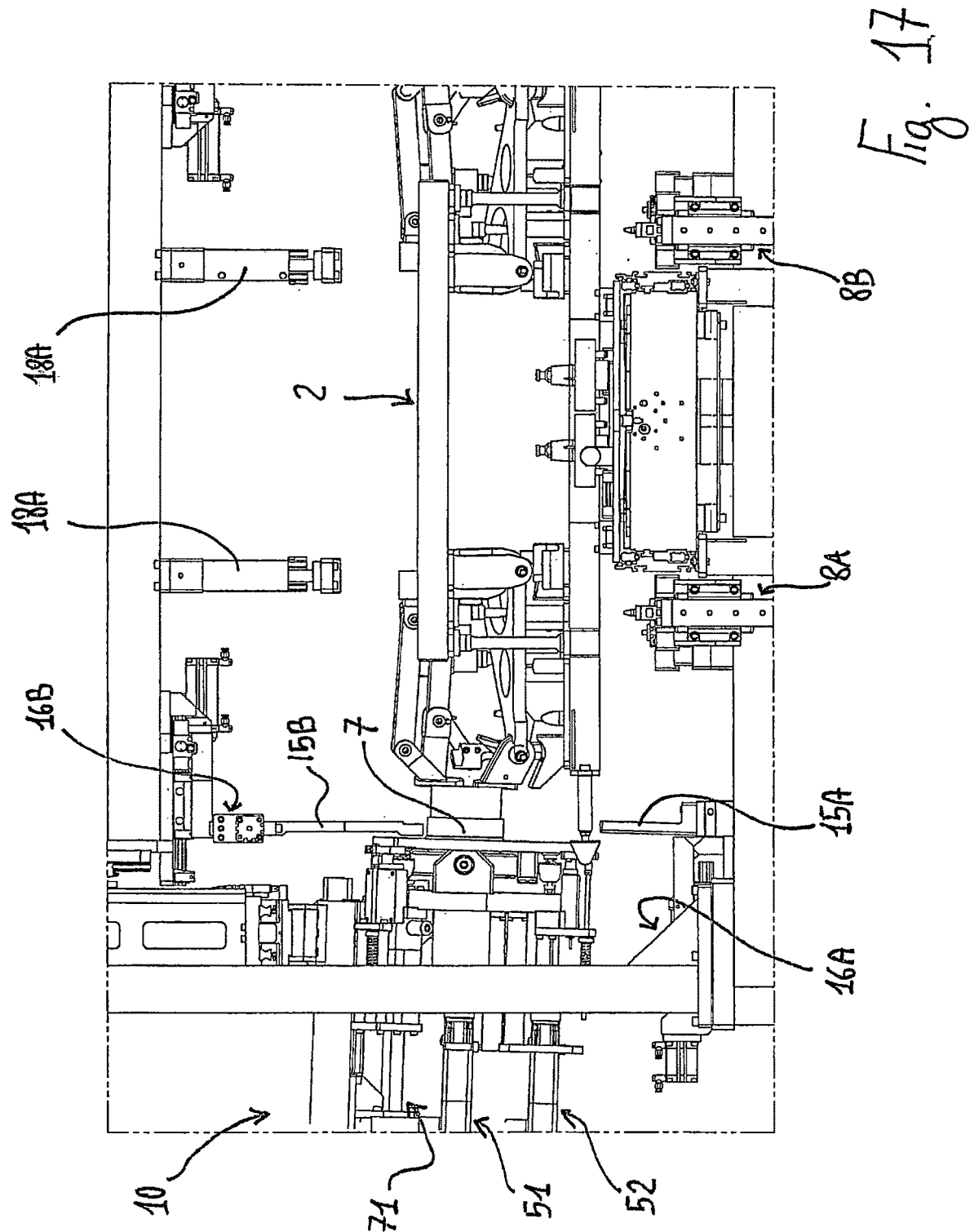

At the end of the coupling between the adjustable plate 12 and the flange 7, the pre-centering device is deactivated and the jaws 15A, 15B are returned to the waiting position (see FIGS. 16 and 17). The constraining devices 8A,8B,8C,8D, which move the suspension 2 to a predetermined adjustment position Z, are then actuated (see FIG. 18). At this point, the first locking means 18A and the second locking means 18B (see FIG. 18,19) are activated in order to lock the suspension 2 in the desired portion along Z. After such locking, the geometry of the suspension is adjusted by activating the adjustment assemblies 10,20. With this regard, the connection means of the head 11 to the corresponding wheel disc are firstly activated 3A,3B. Subsequently, the position of the locating elements 51A,52A is adjusted by means of the adjustment means 51,52, whilst the activation of the pressure means 53 makes it possible to recover the clearance and provide a stable resting for the adjustable plate 12 against the locating elements 51A,52A. This is for the purpose of adjusting the toe-in and the camber of the wheel discs 3A,3B. If required, one or more of the displacement units 71,72,73 may be activated so as to translate the head 11 in the space to the optimal position required by the design of the suspension 2. Having reached such position and the correct values of the angle, the toe-in and camber adjustment screws are closed and possibly together with the other screws which mutually connect the other elements of the suspension 2.

Once the tightening of the screws is competed the operations indicated above are performed backwards. More precisely, the first locking means 18A, the second locking means 18B and the constraining devices 8A,8B,8C,8D are deactivated in sequence. Subsequently or concurrently, the adjustable plate 12 is separated from the flange 7 by activating the coupling/uncoupling device 9 again and the head 11 is moved away from the plate 7 by means of the displacement units 71,72,73.

Figure 20:
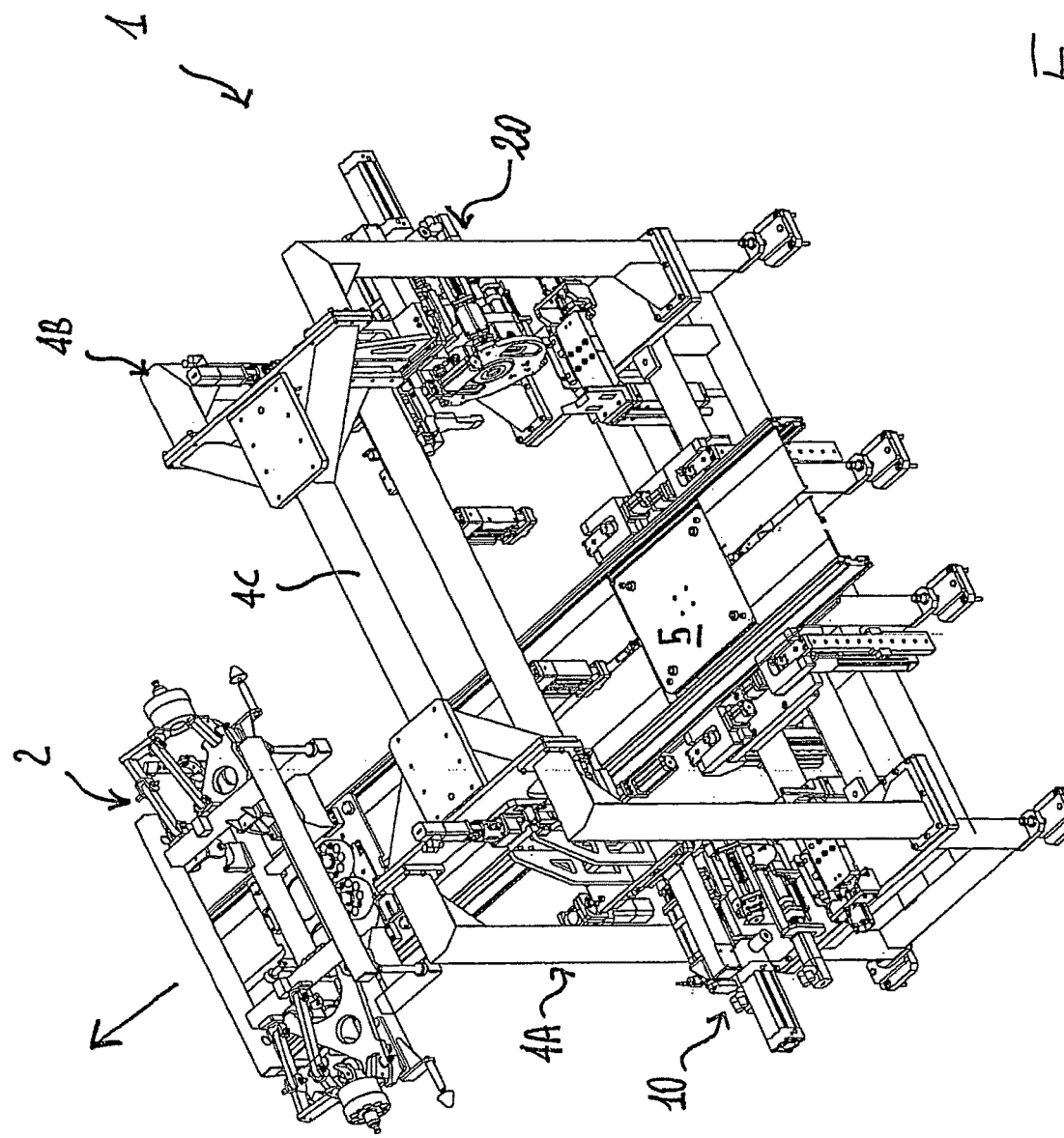

With reference to FIG. 20, when the adjustment assemblies 10,20 are completely released from the suspension 2, the latter projects from the outlet section, preferably towards the same conveying system used before.

Advantageously, the adjustment assembly 10,20 makes it possible to implement a semiautomatic or automatic process with reference to the closing of the camber and toe-in eccentric adjustment screws. "Semiautomatic process" means an operative cycle in which the complete insertion and closing of the eccentric screws are performed directly by operators in charge of processing one or more eccentric screws. In this case, when the suspension 2 enters into station 1, the wheel discs 3A,3B can be easily oriented by the corresponding adjustment assembly 10,20 once the connection between the adjustable plate 12 and the flange 7 have been completed. The movement of the two locating elements 51A,52A along the adjustment axes 501,502 translates into a corresponding variation of the orientation of the adjustable plate 12, and thus of the wheel disc 3A,3B. Having reached the required orientation, the operators can completely insert in seat and tighten the eccentric adjustment screws locking the wheel discs 3A,3B to the correct values of toe-in and camber values. As a function of the suspension configuration, in the "semiautomatic process" once the connection between the adjustable plate 12 and the flange 7 is completed, and before closing the eccentric screws, the corresponding wheel disc 3A,3B could be translated in space through the displacement means 71,72,73 to perform the complete geometry of the suspension. It is further worth noting that in the case of "automatic processing", the locating elements 51A, 51B could also be constrained rigidly to the adjustable plate 12 and the pressure means 53 could also be missing.

In the case of "automatic process", the suspension 2 enters into station 1 with the camber and toe-in eccentric adjustment screws are already inserted completely in their housings. Thus, the wheel discs 3A,3B have a given orientation which may only be varied by turning the eccentric screws themselves. For each adjustment assembly 10,20, the adjustment plate 12 is coupled to the flange 7 by virtue of the presence of the joint 30 which allow the adaptation to the corresponding wheel disc 3A,3B. During such coupling, the locating elements 51A, 52A maintain a neutral position, i.e. such not to interfere with the adjustable plate 12. In this manner, the adjustable plate 12 remains floating, i.e. free to adapt to the orientation established by the position of the eccentric screws. Therefore, in the case of automatic process, the locating elements 51A, 51B are not connected rigidly to the plate 12. The position sensor means 44 constantly detect the position of the adjustable plate 12 and more precisely the orientation thereof. The adjustment is concretized by turning, by means of the automatic means, the eccentric adjustment screws of the suspension 2 inside their housing. Such rotation continues until the position sensor means 44 detect the reaching of the required geometry. At this point, the eccentric screws are tightened. According to a further process, the suspension 2 enters into the station 1 with the camber and toe-in eccentric adjustment screws not completely inserted in their seats, but kept there by means of the retaining means (e.g. forks). This condition is similar to the one envisaged for the semi-automatic process. Indeed, the position of the wheel disc 3A,3B may be set by means of the locating elements 51A,52, with the help of pressure means 53 to recover clearance. Having reached the required orientation for the wheel disc 3A,3B, the retaining means are deactivated so that the eccentric screw can enter into the corresponding seat, possibly through a possible rotation set by means of automatic means. At the same time, the locating elements 51A,52 are taken to a neutral position so as to allow a possible variation the orientation of the wheel disc 3A,3B determined by the reaction of the insertion system of the eccentric screw in the corresponding housing. In this condition, the adjustment according to the "automatic process" described above is continuous, i.e. rotating the eccentric views until the sensor means 44 detect the reaching of the desired geometry.

The adjustment assembly and the assembly station described above fully achieves the predetermined tasks and purposes. In particular, the adjustment assembly allows rapid, effective and repeatable adjustment of the geometry of a suspension. The adjustment assembly and the assembly station are particularly versatile because they easily adapt to the type of suspension to be processed. With this regard, the adjustment assembly may be used in the scope of a semi-automatic operative cycle or in the scope of an automatic cycle.

The invention claimed is:

1. An assembly for adjusting the geometry of a suspension of a vehicle, wherein said suspension comprises at least one wheel disc, wherein said assembly comprises:
   an adjustment head, which includes a supporting plate and an adjustable plate connectable to said wheel disc, said head comprising a joint which connects said adjustable plate to said supporting plate defining a first rotation axis and a second rotation axis for said adjustable plate with respect to said supporting plate, said adjustable plate defining a central reference axis which crosses the intersection point of said rotation axis;
   connection means, configured to connect in integral manner said adjustable plate to said wheel disc and so that by means of such connection said central axis coincides with the axis of said wheel disc;
   toe-in adjustment means, comprising at least one first locating element for said adjustable plate and a first electrical actuator connected to said first locating element, wherein said first electrical actuator defines a first adjustment axis and adjusts the position of said first locating element along said first adjustment axis;
   camber adjustment means, comprising at least one second locating element for said adjustable plate and at least one second electrical actuator connected to said second locating element, wherein said second electrical actuator defines a second adjustment axis and adjusts the position of said second locating element along said second adjustment axis, wherein said electrical actuators adjust the position of the corresponding locating element along the corresponding adjustment axis as a function of the required toe-in and/or camber values; and
   displacement means configured to move said head in space along at least one displacement axis and independently from the activation of said connection means,
   wherein said toe-in adjustment means and said camber adjustment means are arranged so that, in a plane orthogonal to the first adjustment axis, the second adjustment axis, and the central axis, said first adjustment axis is offset with respect to said second adjustment axis by an angle smaller than 180° determined with respect to the central axis defined by the adjustable plate.

2. The assembly according to claim 1, wherein said assembly comprises pressure means which applies a force against said adjustable plate along a thrust direction to keep said adjustable plate against said locating elements.

3. The assembly according to claim 1, wherein, with respect to said central reference axis, said toe-in adjustment means, said camber adjustment means and said pressure means are arranged so that said first adjustment axis and said second adjustment axis are offset by an angle of approximately 90° and so that said thrust direction is off by approximately 135° with respect to each adjustment axis.

4. The assembly according to claim 1, wherein said connection means comprise a flange rigidly connectable to said wheel disc and a coupling/uncoupling device of said flange integral with said adjustable plate.

5. The assembly according to claim 4, wherein said flange comprises a coupling portion and wherein said device comprises a gripper configured to couple said coupling portion to said flange in removable manner, said device further comprising a locking element, configured to lock said gripper in a closed configuration, and an actuator, which acts in contrast with said locking element to switch said gripper from said closed configuration to an open configuration.

6. The assembly according to claim 4, wherein said assembly comprises a pre-centering device of said flange which is activated by the connection of said flange to said wheel disc, and wherein said pre-centering device, when activated, moves said flange, to a predetermined position at which said flange is connected to said adjustable plate, and wherein said pre-centering device is deactivated when the connection of said adjustable plate to said flange is completed.

7. The assembly according to claim 5, wherein said assembly comprises a pre-centering device of said flange which is activated by the connection of said flange to said wheel disc, wherein said pre-centering device, when activated, moves said flange, to a predetermined position at which said flange is connected to said adjustable plate, and wherein said pre-centering device is deactivated when the connection of said adjustable plate to said flange is completed.

8. The assembly according to claim 6, wherein said pre-centering device comprises a pair of jaws configured to engage mutually diametrically opposite surface portions of said flange, and wherein for each of said jaws said pre-centering device comprises translation means for adjusting the position of a corresponding jaws, said translation means being configured to move, in a first step, the corresponding jaws from a first waiting position, corresponding to a deactivation condition of said pre-centering device, to an engaging position with said flange, and to move, in a second step, the corresponding jaw, engaged with said flange, to the predetermined position for connecting said flange to said adjustable plate.

9. The assembly according to claim 7, wherein said pre-centering device comprises a pair of jaws configured to engage mutually diametrically opposite surface portions of said flange, and wherein for each of said jaws said pre-centering device comprises translation means for adjusting the position of a corresponding jaws, said translation means being configured to move, in a first step, the corresponding jaws from a first waiting position, corresponding to a deactivation condition of said pre-centering device, to an engaging position with said flange, and to move, in a second step, the corresponding jaw, engaged with said flange, to the predetermined position for connecting said flange to said adjustable plate.

10. The assembly according to claim 1, wherein said head comprises at least one return device configured to stabilize the orientation of said adjustable plate with respect to said supporting plate.

11. The assembly according to claim 1, wherein said assembly comprises position sensor means configured to detect the position of said adjustable plate with respect to said support plate.

12. The assembly according to claim 1, wherein said displacement means comprise a first displacement unit, which defines a first displacement axis.

13. The assembly according to claim 12, wherein said first displacement unit comprises a first displacement unit electrical actuator, a guiding device which defines the orientation of said first displacement axis and a pneumatic actuator operatively connected to said head to move it parallel to said first displacement axis, said first displacement unit electrical actuator being operatively connected to a movable reference element which defines an abutment surface for said head, said pneumatic actuator moving said head along said first displacement axis until when said head comes into contact with said abutment surface.

14. An assembly station of a suspension wherein said suspension comprises a first wheel disc and a second wheel disc mutually opposite, characterized in that it comprises:
   a resting plane for supporting said suspension;
   a first assembly for adjusting the geometry of said first wheel disc and a second assembly for adjusting the geometry of said second wheel disc, the first and second assemblies each including:
      an adjustment head, which includes a supporting plate and an adjustable plate connectable to said wheel disc, said head comprising a joint which connects said adjustable plate to said supporting plate defining a first rotation axis and a second rotation axis for said adjustable plate with respect to said supporting plate, said adjustable plate defining a central reference axis which crosses the intersection point of said rotation axis;
      connection means, configured to connect in integral manner said adjustable plate to said wheel disc and so that by means of such connection said central axis coincides with the axis of said wheel disc;
      toe-in adjustment means, comprising at least one first locating element for said adjustable plate and a first electrical actuator connected to said first locating element, wherein said first electrical actuator defines a first adjustment axis and adjusts the position of said first locating element along said first adjustment axis;
      camber adjustment means, comprising at least one second locating element for said adjustable plate and at least one second electrical actuator connected to said second locating element, wherein said second electrical actuator defines a second adjustment axis and adjusts the position of said second locating element along said second adjustment axis, wherein said electrical actuators adjust the position of the corresponding locating element along the corresponding adjustment axis as a function of the required toe-in and/or camber values; and
      displacement means configured to move said head in space along at least one displacement axis and independently from the activation of said connection means,
      wherein said toe-in adjustment means and said camber adjustment means are arranged so that, in a plane orthogonal to the first adjustment axis, the second adjustment axis, and the central axis, said first adjustment axis is offset with respect to said second adjustment axis by an angle smaller than 180° determined with respect to the central axis defined by the adjustable plate;
   a frame with two opposite parts with respect to said resting plane, said first assembly being installed on said first part, said second assembly being installed on said second part; and
   constraining devices configured to define a technological reference for said suspension and to adjust the position of said suspension at least along a direction orthogonal to said resting plane.

15. The assembly station according to claim 14, wherein said constraining devices are configured to adjust the position of said suspension on a reference plane parallel to said resting plane.

16. The assembly station according to claim 14, wherein said station comprises first locking means and/or second locking means configured to lock the suspension in a predetermined position along, said direction, said first locking means being configured to apply, when activated, a thrust on said suspension directed towards said resting plane, said second locking means being configured to lock when activated, said constraining devices at the predetermined height along said direction orthogonal to said resting plane.

17. The assembly station according to claim 15, wherein said station comprises first locking means and/or second locking means configured to lock the suspension in a predetermined position along said direction, said first locking means being configured to apply, when activated, a thrust on said suspension directed towards said resting plane, said second locking means being configured to lock, when activated, said constraining devices at the predetermined height along said direction orthogonal to said resting plane.

18. The assembly according to claim 12, wherein said displacement means further comprise a second displacement unit, which defines a second displacement axis orthogonal to said first displacement axis.

19. The assembly according to claim 18, wherein said displacement means further comprise a third displacement unit, which defines a third displacement axis orthogonal to said first and second displacement axes.

* * * * *